United States Patent
Yayama

(10) Patent No.: US 9,587,994 B2
(45) Date of Patent: Mar. 7, 2017

(54) SEMICONDUCTOR DEVICE

(71) Applicant: Renesas Electronics Corporation, Kanagawa (JP)

(72) Inventor: Kosuke Yayama, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/805,624

(22) Filed: Jul. 22, 2015

(65) Prior Publication Data
US 2016/0054183 A1    Feb. 25, 2016

(30) Foreign Application Priority Data

Aug. 21, 2014   (JP) .................... 2014-168171

(51) Int. Cl.
*H03M 1/48* (2006.01)
*G01K 15/00* (2006.01)
*G01K 7/01* (2006.01)

(52) U.S. Cl.
CPC ........... *G01K 15/005* (2013.01); *G01K 7/01* (2013.01)

(58) Field of Classification Search
CPC .............. G01K 15/005; G01K 7/01
USPC ............................. 341/155, 115
See application file for complete search history.

(56) References Cited

U.S. PATENT DOCUMENTS

| 6,806,695 B1 * | 10/2004 | Broach ........... H03K 19/00369 323/364 |
| 7,643,889 B2 | 1/2010 | Jeong et al. |
| 7,686,508 B2 * | 3/2010 | Lin .................. G01K 7/015 327/512 |
| 8,915,646 B2 * | 12/2014 | Wei ................... G01K 7/34 341/155 |
| 2007/0005289 A1 * | 1/2007 | Huang ............... G01K 7/42 702/130 |

FOREIGN PATENT DOCUMENTS

| JP | 62-84729 S | 5/1987 |
| JP | 2004-72289 A | 3/2004 |
| JP | 2008-97805 A | 4/2008 |

* cited by examiner

*Primary Examiner* — Khai M Nguyen
(74) *Attorney, Agent, or Firm* — Mattingly & Malur, PC

(57) ABSTRACT

There is provided a semiconductor device which can provide desired output characteristics suitable to applications. A semiconductor device 10 includes a temperature sensing unit 11 which generates an analog sensing signal corresponding to a temperature, and an AD converter unit 12 which converts the analog sensing signal into a digital output signal corresponding to an adjusted temperature change rate based on a temperature change rate adjustment signal for adjusting the temperature change rate. The temperature change rate refers to a change in a detected temperature per bit of a digital output signal.

17 Claims, 19 Drawing Sheets

BEFORE ADJUSTMENT

AFTER ADJUSTMENT

BEFORE ADJUSTMENT

AFTER ADJUSTMENT

IN CASE OF Vptat2 = Vptat

IN CASE OF Vptat2 = αVptat (α > 1)

BEFORE ADJUSTMENT

AFTER ADJUSTMENT

SEMICONDUCTOR DEVICE

CROSS-REFERENCE TO RELATED APPLICATIONS

This application is based upon and claims the benefit of priority from Japanese patent application No. 2014-168171, filed on Aug. 21, 2014, the disclosure of which is incorporated herein in its entirety by reference.

BACKGROUND

The present invention relates to a semiconductor device, and, for example, relates to a semiconductor device which detects a temperature.

In recent years, a rise in a current density accompanied by miniaturization of LSI (Large Scale Integration) increases necessity for temperature management, and integration of sensors into one chip is demanded, and therefore mounting temperature sensors on semiconductor devices such as microcomputers and SoCs (System on Chip) is increasing. A temperature sensor which is mounted on a semiconductor device can realize various applications by outputting a digital output signal of a digital value corresponding to a temperature to be detected, and using this digital output signal.

For example, Japanese Unexamined Patent Application Publication No. 2008-97805, Japanese Utility Model No. S62-84729 and Japanese Unexamined Patent Application Publication No. 2004-72289 disclose related techniques. Japanese Unexamined Patent Application Publication No. 2008-97805 and Japanese Utility Model No. S62-84729 disclose techniques of correcting an output error of a temperature sensor. Japanese Unexamined Patent Application Publication No. 2004-72289 discloses a technique of adjusting a variation of an oscillation frequency of an oscillation circuit according to an output of a temperature sensor.

SUMMARY

There has been a problem that a related semiconductor device can correct output characteristics of a digital output signal corresponding to a temperature of a temperature sensor to some degree, yet has difficulty in obtaining desired output characteristics suitable to various applications.

The other tasks and new features will be more apparatus from description of this specification and the accompanying drawings.

According to one embodiment, a semiconductor device includes a temperature sensing unit that senses a temperature, and an AD converter unit that performs analog/digital conversion. The temperature sensing unit generates an analog sensing signal corresponding to the temperature. The AD converter unit converts the sensing signal into a digital output signal corresponding to an adjusted temperature change rate based on a temperature change rate adjustment signal for adjusting the temperature change rate that is output characteristics.

According to the one embodiment, it is possible to obtain desired output characteristics corresponding to the temperature.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
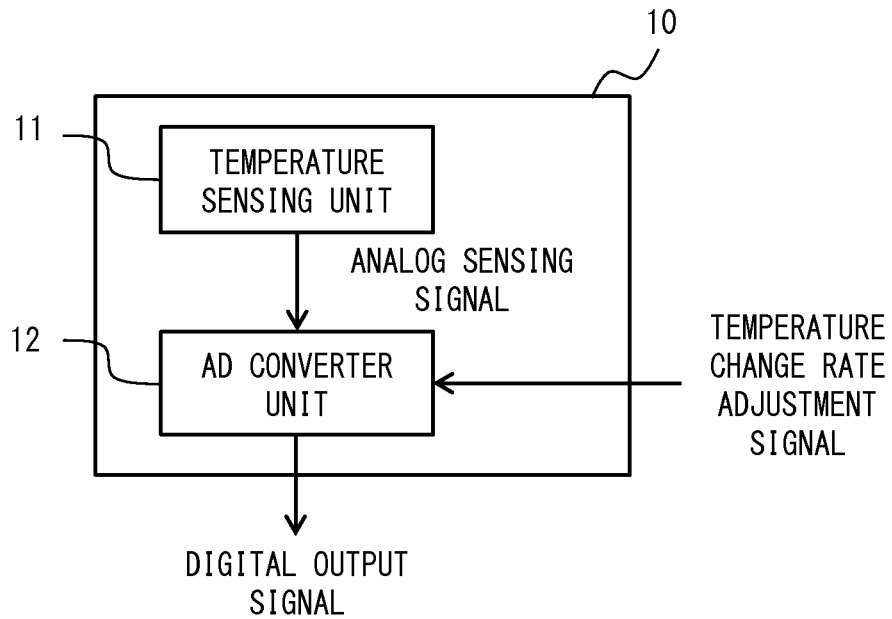
FIG. 1 is a configuration diagram illustrating a schematic configuration of a semiconductor device according to embodiments.

For clarification of description, the following description and drawings are optionally omitted and simplified. Further, each element which is illustrated in the drawings as a functional block which performs various processing can be configured as a CPU, a memory or other circuits in terms of hardware, and can be realized as a program loaded to a memory in terms of software. Hence, that these functional blocks are realized in various formats such as hardware alone, software alone or combinations thereof should be understood by one of ordinary skill in art, and the functional blocks are not limited to one of hardware, software or combinations thereof. In addition, the same element will be assigned the same reference numeral in each drawing, and overlapping description will be omitted when necessary.

Outline of Embodiments

FIG. 1 illustrates an example of the outline of a semiconductor device according to the embodiments described later. As illustrated in FIG. 1, a semiconductor device 10 according to the embodiments is a device which outputs a digital output signal (digital value) corresponding to a temperature, and includes a temperature sensing unit 11 which senses the temperature and an AD converter unit 12 which performs analog/digital conversion. The temperature sensing unit 11 generates an analog sensing signal corresponding to the temperature. The AD converter unit 12 converts the analog sensing signal into a digital output signal corresponding to an adjusted temperature change rate based on a temperature change rate adjustment signal for adjusting the temperature change rate.

Figure 2:
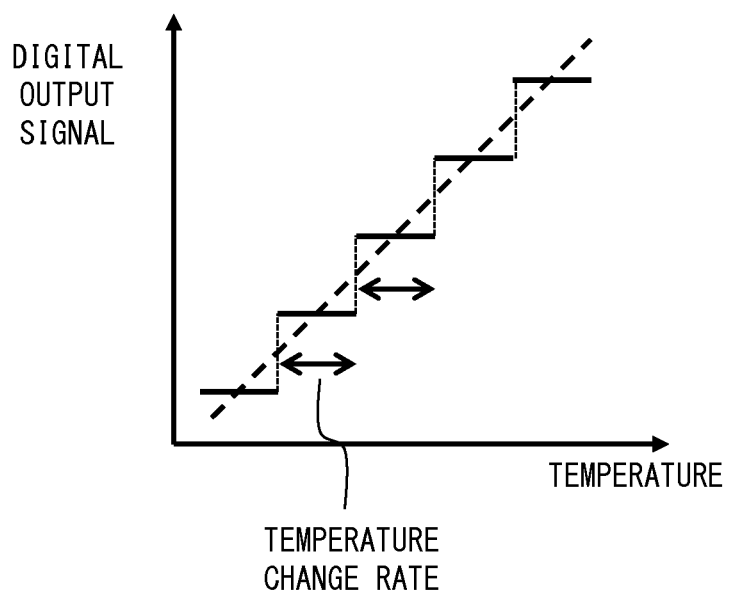
FIG. 2 is a graph for explaining output characteristics of the semiconductor device according to the embodiments.

In this regard, the temperature change rate refers to a change in a digital output signal (output code) and an inclination of the temperature as illustrated in FIG. 2. That is, the temperature change rate refers to output characteristics (detection characteristics) of a temperature sensor, refers to a change in a detected temperature corresponding to an output bit (1 bit) and can be paraphrased as sensitivity, resolution and a temperature coefficient per bit.

As illustrated in FIG. 1, in the embodiments, the temperature change rate is adjusted based on a temperature change rate adjustment signal, and a digital output signal which changes at the adjusted temperature change rate is outputted. Consequently, it is possible to freely change the temperature change rate, and obtain an output signal of desired characteristics suitable to various applications.

In addition, Japanese Unexamined Patent Application Publication No. 2008-97805 and Japanese Utility Model No. S62-84729 disclose correcting an output error of a temperature sensor yet do not disclose arbitrarily adjusting a temperature change rate. Further, Japanese Unexamined Patent Application Publication No. 2004-72289 discloses a frequency adjustment circuit which corrects an error of an oscillation frequency by using a temperature sensor yet does not disclose adjusting an output of the temperature sensor.

First Embodiment

Figure 3:
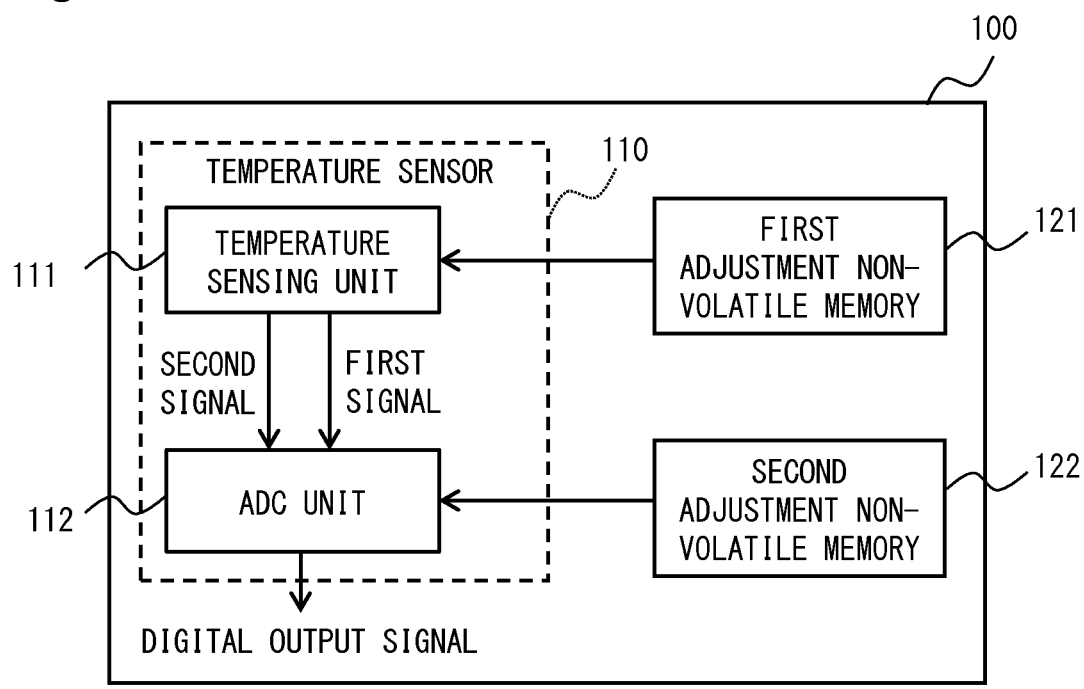
FIG. 3 is a configuration diagram illustrating a configuration example of a semiconductor device according to a first embodiment.

The first embodiment will be described below with reference to the drawings. FIG. 3 illustrates a configuration of a semiconductor device according to the present embodiment. As illustrated in FIG. 3, the semiconductor device 100 includes a temperature sensor 110, a first adjustment non-volatile memory 121 and a second adjustment non-volatile memory 122. Further, the temperature sensor 110 includes a temperature sensing unit 111 and an ADC (Analog/Digital Converter) unit 112.

The first adjustment non-volatile memory (error correction data storage unit) 121 is an adjustment non-volatile memory for shipping. The first adjustment non-volatile memory 121 stores adjustment data for shipping (error correction data) for adjusting (correcting and trimming) an error (including a temperature change rate) due to manufacturing variations of the temperature sensing unit 111, and supplies the adjustment data for shipping to the temperature sensing unit 111. The adjustment data for shipping is data of a value fixed upon shipping of a semiconductor device, and is not changed after the shipping. Hence, the first adjustment non-volatile memory 121 is, for example, a non-volatile memory such as a fuse whose stored data cannot be changed.

The second adjustment non-volatile memory (temperature change rate adjustment data storage unit) 122 is an adjustment non-volatile memory different from the first adjustment non-volatile memory 121. The second adjustment non-volatile memory 122 stores temperature change rate adjustment data which a user uses to adjust (set) a temperature change rate, and supplies the temperature change rate adjustment data to the ADC unit 112. The temperature change rate adjustment data is data which can be changed by the user to an arbitrary value according to an application. Hence, the second adjustment non-volatile memory 122 is, for example, a non-volatile memory such as a flash memory whose stored data can be changed. In addition, the second adjustment non-volatile memory 122 may be a volatile memory since temperature change rate adjustment data only needs to be stored upon use of a semiconductor device.

The first adjustment non-volatile memory 121 and the second adjustment non-volatile memory 122 may be configured as one semiconductor storage device. Further, the first adjustment non-volatile memory 121 and the second adjustment non-volatile memory 122 may be provided outside the semiconductor device 100 to input adjustment data for shipping and temperature change rate adjustment data to the semiconductor device 100 from an outside.

In the present embodiment, mainly, the first adjustment non-volatile memory 121 corrects an error, and the second adjustment non-volatile memory 122 adjusts a temperature change rate. In other words, it can be paraphrased that two memories of the first adjustment non-volatile memory 121 and the second adjustment non-volatile memory 122 adjust a temperature change rate which is output characteristics of a temperature sensor. By securing a little memory region by using the first adjustment non-volatile memory 121 and the second adjustment non-volatile memory 122, the user can easily set an optimal temperature change rate for each use.

The temperature sensor (temperature sensor unit) 110 is a sensor which is mounted on the semiconductor device 100 and senses (detects) a temperature, and outputs a digital output signal corresponding to the temperature of the semiconductor device 100 to be sensed.

The temperature sensing unit 111 generates an analog sensing signal corresponding to a temperature. The temperature sensing unit 111 corrects the sensing signal based on adjustment data for shipping (error correction signal) of the first adjustment non-volatile memory 121, and outputs the corrected sensing signal. The temperature sensing unit 111 generates as sensing signals a first signal (non-temperature dependence signal as VBGR) of a fixed voltage which does not depend on the temperature and a second signal (temperature dependence signal as Vptat) of a voltage which depends on a temperature, and outputs the first signal and the second signal to the ADC unit 112.

The ADC unit 112 AD-converts an analog sensing signal generated by the temperature sensing unit 111, and generates a digital output signal. The ADC unit 112 adjusts the temperature change rate based on the temperature change rate adjustment data (temperature change rate adjustment signal) of the second adjustment non-volatile memory 122, and generates a digital output signal of the adjusted temperature change rate. The ADC unit 112 converts the Vptat into a digital value based on the first signal (VBGR) and the second signal (Vptat), i.e., more specifically, by referring to VBGR.

Figure 4:
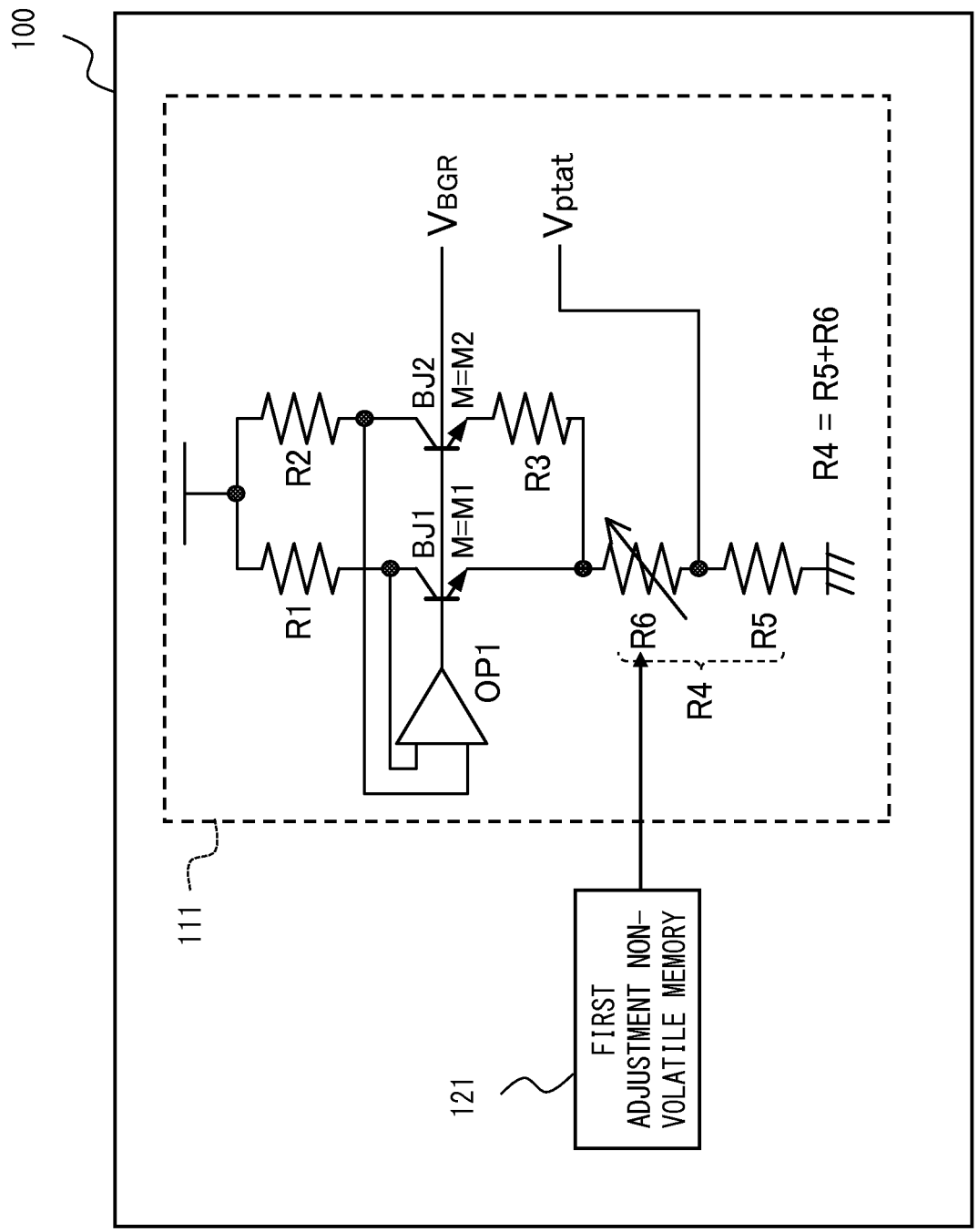
FIG. 4 is a circuit diagram illustrating a configuration example of a temperature sensing unit according to the first embodiment.

FIG. 4 illustrates a specific example of a circuit configuration of the temperature sensing unit 111 according to the present embodiment. The temperature sensing unit 111 is a circuit which outputs two types of reference voltages of Vptat and VBGR, and is, for example, a Brocaw bandgap reference circuit.

As illustrated in FIG. 4, the temperature sensing unit 111 includes resistors R1, R2, R3, R5 and R6, bipolar transistors BJ1 and BJ2 and an operational amplifier OP1. The bipolar transistors BJ1 and BJ2 are, for example, NPN bipolar transistors.

The resistor R1 and the bipolar transistor BJ1 (first transistor) are connected in series between a power supply potential (first potential) and a ground potential (second potential), the resistor R2, the bipolar transistor BJ2 (second transistor) and the resistor R3 are connected in series, and the resistor R1 and the bipolar transistor BJ1, the resistor R2, the bipolar transistor BJ2 and the resistor R3 are connected in parallel. The resistor R6 (first resistor element) and the resistor R5 (second resistor element) are connected in series between the bipolar transistor BJ1 and the resistor R3, and the ground potential.

A node between the resistor R1 and the bipolar transistor BJ1 is connected to one input terminal of the operational amplifier OP1, and a node between the resistor R2 and the bipolar transistor BJ2 is connected to the other input terminal of the operational amplifier OP1. An output terminal of the operational amplifier OP1, a base of the bipolar transistor BJ1 and a base of the bipolar transistor BJ2 are commonly connected, and a voltage of this common connection is outputted as VBGR. A voltage of the node between the resistor R6 and the resistor R5 is outputted as Vptat.

In this regard, the numbers of parallel bipolar transistors BJ1 and BJ2 are M1 and M2, respectively, and the resistors R1 and R2 take equal resistance values. Then, Vptat and VBGR are expressed as in following equation (1) and equation (2). In addition, in the following equations, k represents a Boltzmann constant, q represents an elementary charge, n represents a ratio of bipolar transistors (=M2/M1), T represents an absolute temperature, Eg represents band gap energy of Si, A represents a constant of proportionality, Ic represents a collector current of bipolar transistor and R4 represents R5+R6.

$$Vptat = 2\frac{R5}{R3}\frac{kT}{q}\ln(n) \quad \text{equation (1)}$$

$$VBGR = Vbe + Vptat = Vbe + 2\frac{R4}{R3}\frac{kT}{q}\ln(n) \quad \text{equation (2)}$$

Voltages Vbe of the bipolar transistors BJ1 and BJ2 are expressed as in following equation (3), and therefore VBGR can be expressed as in following equation (4) in view of equation (2) and $$Vbe = \frac{Eg}{q} - \frac{kT}{q}\ln\left(\frac{A}{Ic}\right) \quad \text{equation (3)}$$

$$VBGR = \frac{Eg}{q} - \frac{kT}{q}\ln\left(\frac{A}{Ic}\right) + 2\frac{R5+R6}{R3}\frac{kT}{q}\ln(n) \quad \text{equation (4)}$$
$$= \frac{Eg}{q} + \frac{kT}{q}\left(2\frac{R5+R6}{R3}\ln(n) - \ln\left(\frac{A}{Ic}\right)\right)$$

equation (3).

Vptat has characteristics which are proportional to the absolute temperature T in view of equation (1), and Vbe has characteristics opposite to those of Vptat in view of equation (3). Hence, according to equation (4), by adjusting resistances such that negative temperature dependency of Vbe and positive temperature dependency of Vptat cancel each other, VBGR can have fixed characteristics with respect to the temperature.

By setting R6 as a variable resistor to adjust this resistance, and changing a resistance value according to a value of the first adjustment non-volatile memory 121, it is possible to adjust an error of VBGR (voltage level) without changing a value of Vptat. In addition, R3 and R5 may be set as variable resistors to adjust an error.

Figure 5:
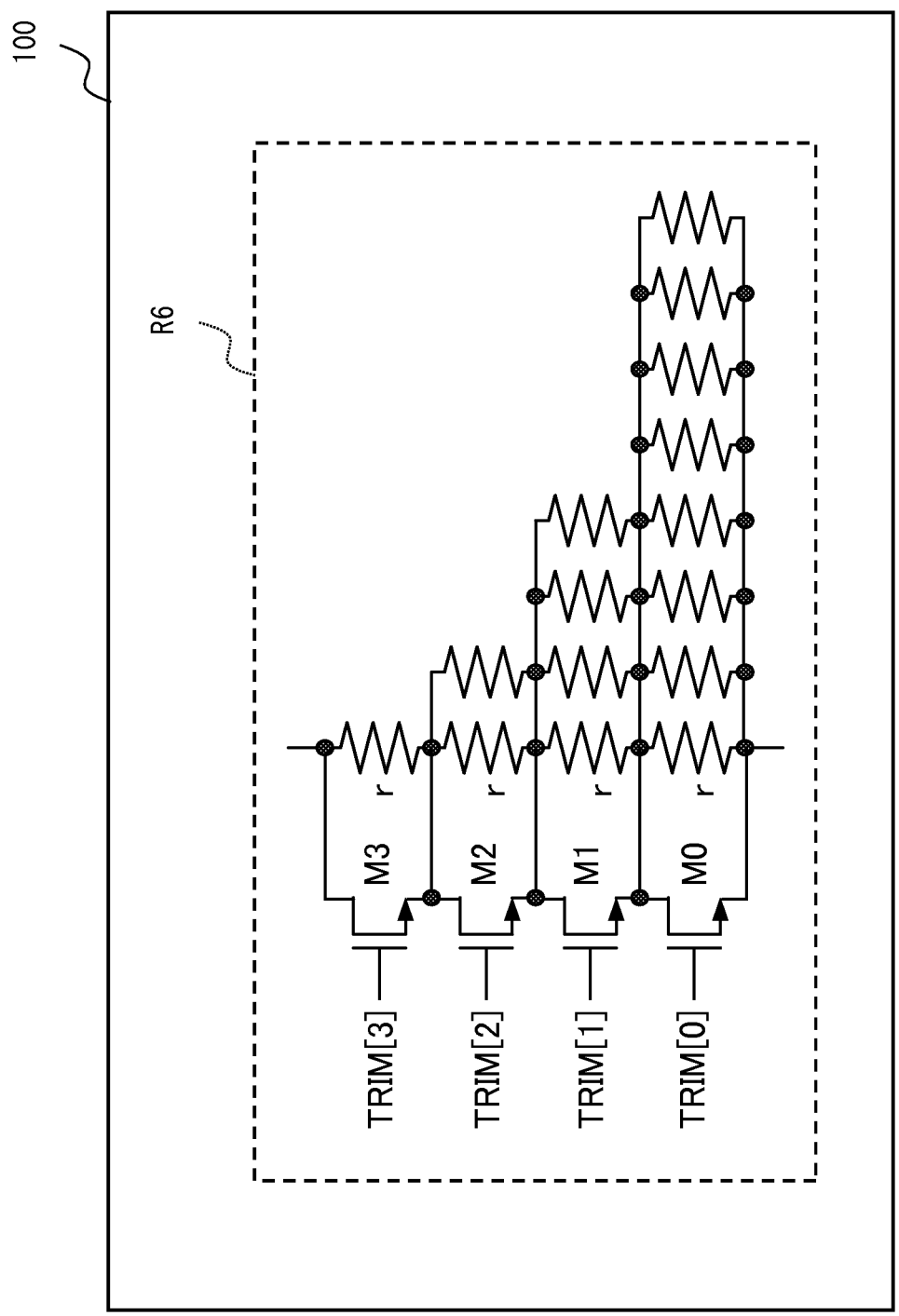
FIG. 5 is a circuit diagram illustrating a configuration example of a variable resistor according to the first embodiment.

FIG. 5 illustrates a specific example of a circuit configuration of the variable resistor R6. According to this method, R6 can change a resistance value according to a value (error correction data) of a code stored in the first adjustment non-volatile memory 121. For example, TRIM [3:0] of 4 bits is stored as error correction data in the first adjustment non-volatile memory 121.

As illustrated in FIG. 5, the variable resistor R6 includes MOS transistors M0 to M3 and a plurality of resistors r. The MOS transistor M3 and one resistor r are connected in parallel, the MOS transistor M2 and the two resistors r are connected in parallel, the MOS transistor M1 and the four resistors r are connected in parallel, and the MOS transistor M0 and the eight resistors r are connected in parallel. Further, these MOS transistors and the resistors r connected in parallel are connected in series in order of the MOS transistors M3, M2, M1 and M0.

TRIM [0] to [3] of the first adjustment non-volatile memory 121 are supplied to the MOS transistors M0 to M3, respectively. A resistance value of the variable resistor R6 is adjusted by switching between on and off of the MOS transistors M0 to M3 by bit values (high/low) of TRIM [0] to [3]. An increase or a decrease of r (a resistance value of one resistor r) is adjusted based on 1/0 of TRIM [3], an increase or a decrease of r/2 is adjusted based on 1/0 of TRIM [2], an increase or a decrease of r/4 is adjusted based on 1/0 of TRIM [1] and an increase or a decrease of r/8 is adjusted based on 1/0 of TRIM [0].

Figure 6:
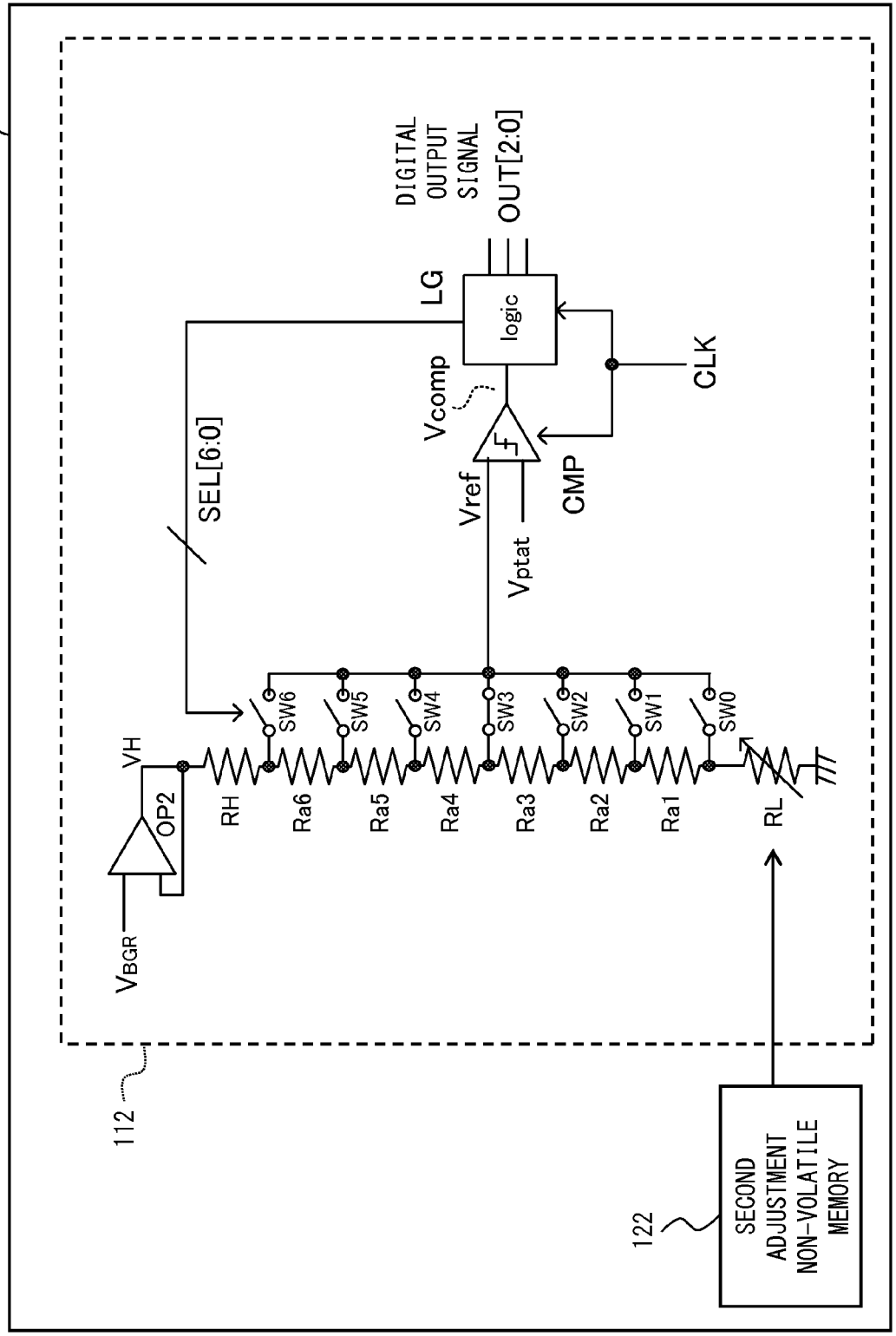
FIG. 6 is a circuit diagram illustrating a configuration example of an ADC unit according to the first embodiment.

FIG. 6 illustrates a specific example of a circuit configuration of the ADC unit 112 according to the present embodiment. The ADC unit 112 converts temperature information into a digital output signal (OUT [2:0]) by using characteristics of two voltages outputted from the temperature sensing unit 111. The ADC unit 112 is, for example, a basic 3-bit successive approximation ADC for ease of description. When the ADC unit 112 is actually used, a countermeasure to increase the number of bits or accuracy needs to be taken according to a purpose of use. Further, the ADC unit 112 only needs to be configured to perform AD conversion by using two voltages of the temperature sensing unit 111, and therefore may be a delta-sigma ADC other than a successive approximation ADC.

As illustrated in FIG. 6, the ADC unit 112 includes an operational amplifier OP2, a resistor RH, a plurality of resistors Ra (Ra1 to Ra6), a resistor RL, switches SW0 to SW6, a comparator CMP and a logic circuit LG. One input terminal of the operational amplifier OP2 receives an input of VBGR generated by the temperature sensing unit 111, and the other input terminal is feedback-connected with an output terminal of the operational amplifier OP2.

Between the output terminal of the operational amplifier OP2 and the ground potential, the resistor RH, the six resistors Ra (Ra1 to Ra6) and the resistor RL are connected in series. Switches SW0 to SW6 are connected between respective nodes between the resistor RH, the resistors Ra1 to Ra6 and the resistor RL, and one input terminal of the comparator CMP, respectively.

The other input terminal of the comparator CMP receives an input of Vptat generated by the temperature sensing unit 111, and the output terminal is connected to an input terminal of the logic circuit LG. The comparator CMP and the logic circuit LG receive a supply of an operation clock for performing a successive approximation operation.

The logic circuit LG is a circuit which performs AD conversion by controlling the successive approximation operation, and outputs a digital output signal which is an AD conversion result. The logic circuit LG outputs SEL [6:0] for switching between on and off of the switches SW0 and SW6 to perform successive approximation. The logic circuit LG generates and outputs digital output signal out [2:0] based on a comparison result of the comparator CMP.

Figure 7A:
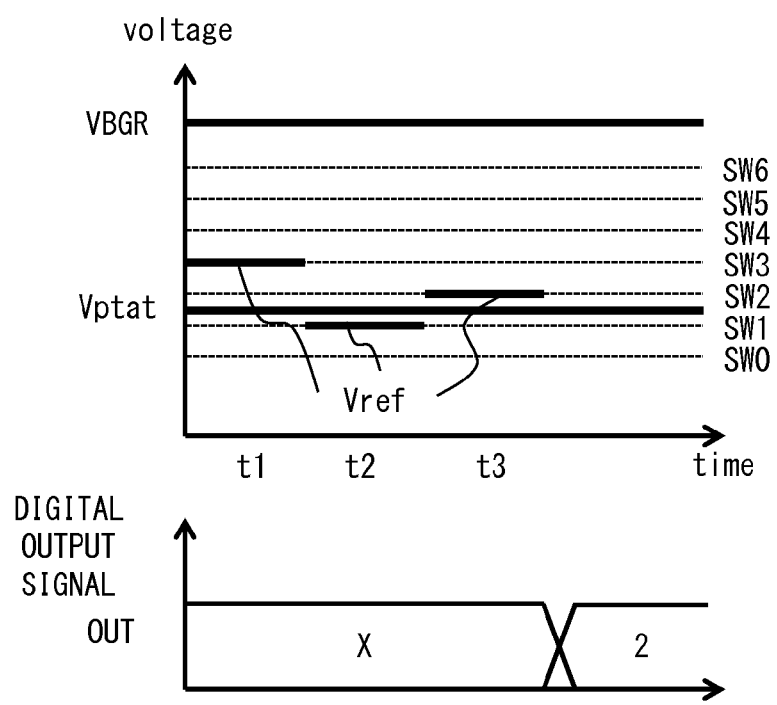
FIG. 7A is a graph for explaining an operation of the ADC unit according to the first embodiment.
Figure 7B:
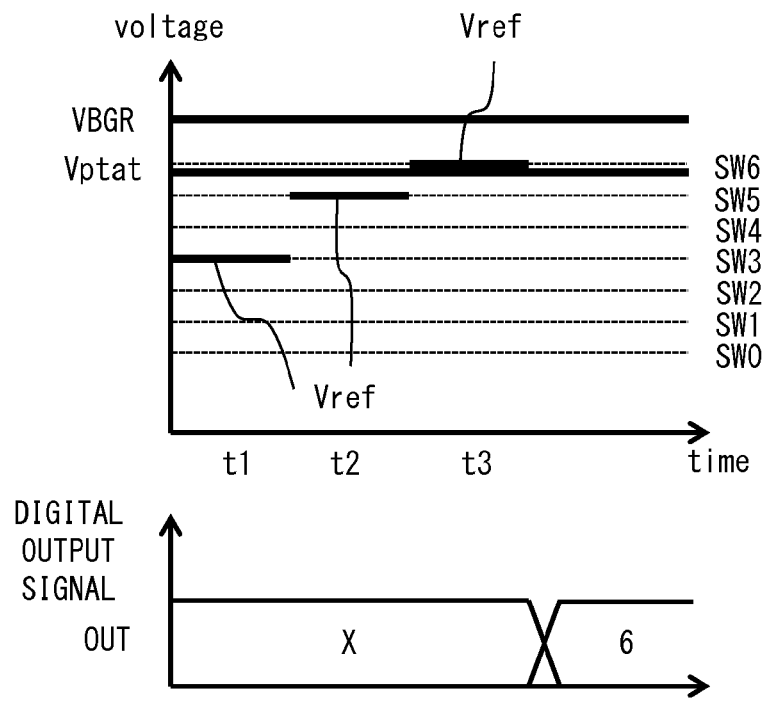
FIG. 7B is a graph for explaining the operation of the ADC unit according to the first embodiment.

FIGS. 7A and 7B illustrate operation waveforms of the ADC unit 112. A voltage follower circuit of the operational amplifier OP2 in the ADC unit 112 receives VBGR from the temperature sensing unit 111, and VH, which is an output voltage of the operational amplifier OP2, =VBGR becomes true. By dividing this VH in voltage dividing circuits (voltage dividing units) of the resistors RH, Ra1 to Ra6 and RL, voltages of nodes of the switches SW0 to SW6 are determined. The voltage inputted to the comparator CMP through the switches SW0 to SW6 in the on state becomes Vref (reference voltage).

Next, the logic circuit LG determines the switches SW0 to SW6 to place in the on state, based on a result of the comparator CMP which receives an input of Vptat and Vref from the temperature sensing unit 111. As illustrated in FIG. 7A, at a time t1 at which successive approximation is started, the logic circuit LG places the switch SW3 in the on state to select a first intermediate voltage, and the comparator CMP compares Vref and Vptat through the switches SW3. At the time t1, Vptat is lower than Vref, and therefore the logic circuit LG switches to SW1 a switch to place in the on state to select a lower intermediate voltage than current Vref at a next time t2. At the time t2, Vptat is higher than Vref, and therefore the logic circuit LG switches to SW2 a switch to place in the on state to select a higher intermediate voltage than current Vref at a next time t3. Upon further comparison in the state at the time t3, Vptat is lower than Vref, and therefore the logic circuit LG determines that the voltage of Vptat is between the switch SW1 and the switch SW2 and outputs the digital output signal OUT=2.

Similar to FIG. 7A, in FIG. 7B, the switch SW3 is in the on state at the first time t1, Vptat is higher than Vref and therefore the logic circuit LG switches to SW5 a switch to place in the on state to select a higher intermediate voltage than current Vref at the time t2. At the time t2, Vptat is higher than Vref, and therefore the logic circuit LG switches to SW6 a switch to place in the on state to select a higher intermediate voltage than current Vref at the time t3. Upon further comparison in the state at the time t3, Vptat is lower than Vref, and therefore the logic circuit LG determines that the voltage of Vptat is between the switch SW5 and the switch SW6 and outputs a digital output signal OUT=6.

Next, a method of adjusting a temperature change rate by using the second adjustment non-volatile memory 122 will be described. In the present embodiment, the temperature change rate is adjusted by changing a value of the resistor RL for determining Vref of the ADC unit 112. A mechanism which changes a resistance value of the resistor RL may be the same mechanism as that of the variable resistor R6 in FIG. 5. That is, by changing the resistance value of the resistor RL according to a value (temperature change rate adjustment data) of a code stored in the second adjustment non-volatile memory 122, the divided voltage of the resistor Ra, i.e., a potential difference between the neighboring switches SW is adjusted. By changing the resistor RL (or the resistor RH) and adjusting the reference voltage (Vref), the temperature change rate is adjusted. Consequently, it is possible to adjust the temperature change rate without adding a special circuit to an adjustment circuit in the temperature sensing unit or the ADC unit.

Figure 8A:
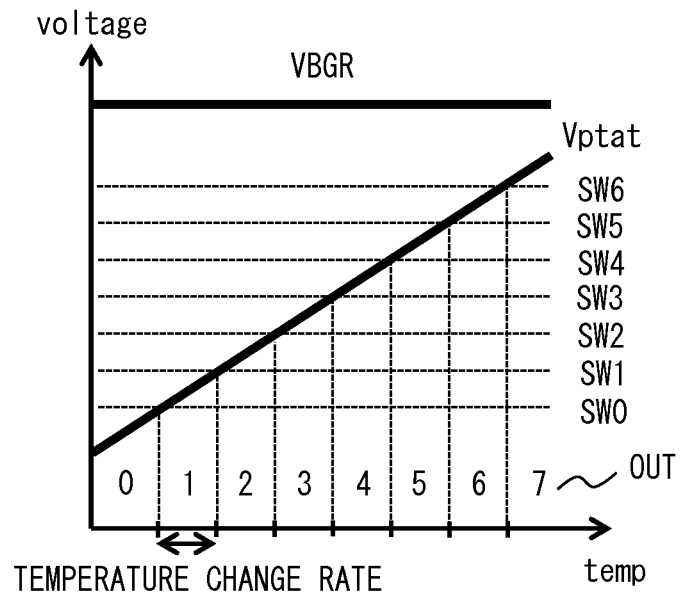
FIG. 8A is a graph for explaining a method of adjusting the semiconductor device according to the first embodiment.

FIG. 8A illustrates a relationship between a change in a voltage with respect to the temperature and voltages of the switches SW0 to SW6 of the ADC unit 112. A value of the digital output signal OUT is determined by comparison between the voltage of Vptat and the voltages of the switches SW0 to SW6, and therefore a range of the temperature corresponding to the voltages of the neighboring switches SW is the temperature change rate (a temperature range per bit).

Figure 8B:
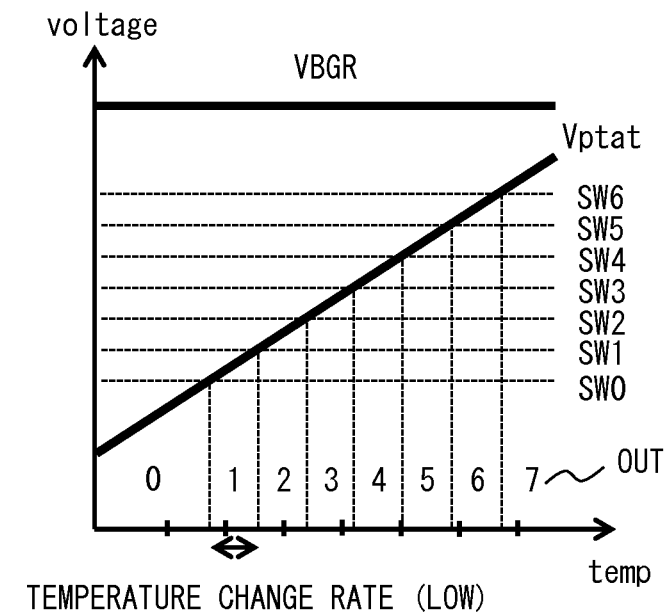
FIG. 8B is a graph for explaining the method of adjusting the semiconductor device according to the first embodiment.

FIG. 8B illustrates an example where the value of the resistor RL is adjusted to a larger value than that in FIG. 8A. In this case, the resistor RL is large, and therefore the voltage of each of the switches SW0 to SW6 rises. Then, VBGR is fixed, and therefore a voltage difference between the neighboring switches SW becomes small. Consequently, the temperature range of one bit corresponding to the voltages of the neighboring switches SW narrows, and therefore the temperature change rate becomes low. Further, when the value of the resistor RL is decreased, the voltage of each of the switches SW0 to SW6 lowers, the voltage difference between the neighboring switches SW becomes large, and therefore the temperature change rate becomes high.

Figure 9A:
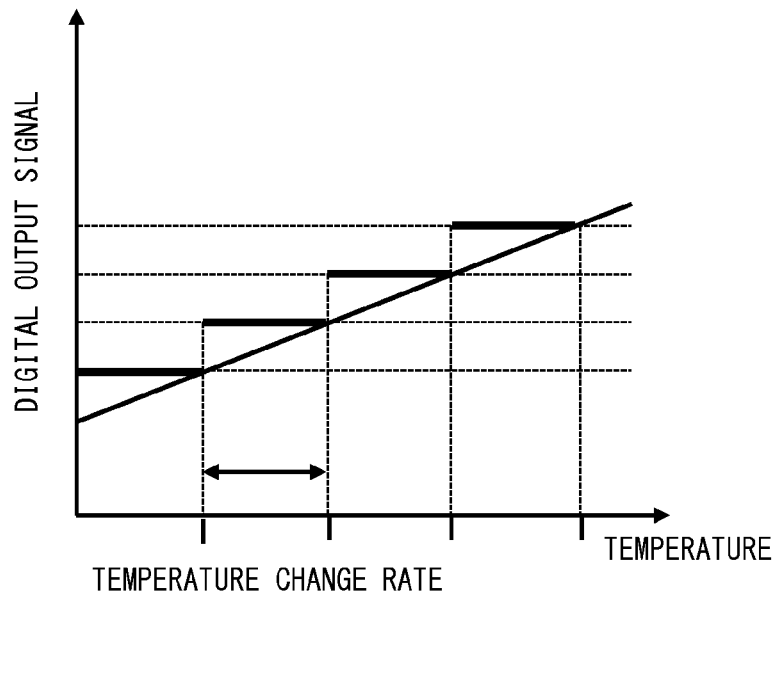
FIG. 9A is a graph for explaining the method of adjusting the semiconductor device according to the first embodiment.
Figure 9B:
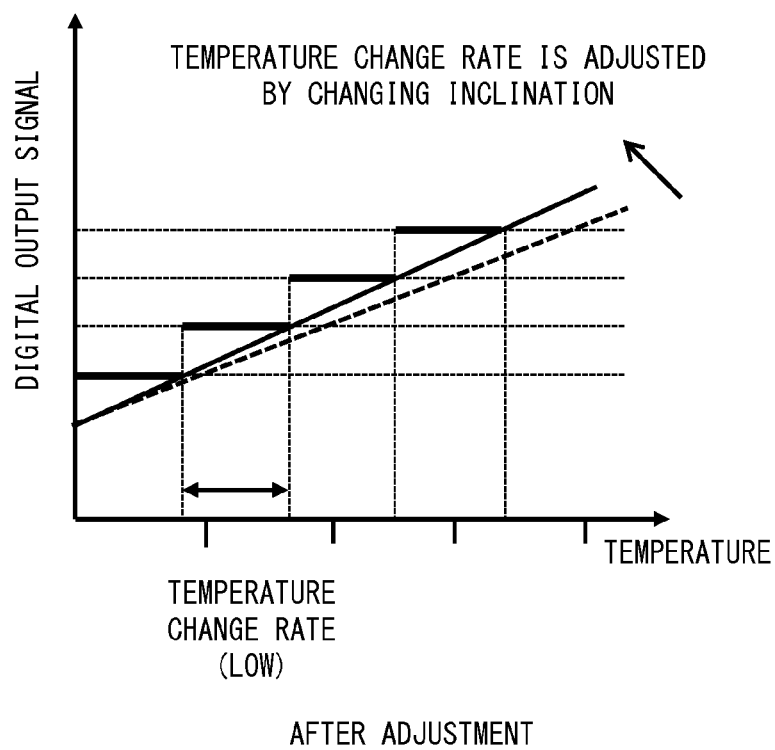
FIG. 9B is a graph for explaining the method of adjusting the semiconductor device according to the first embodiment.

FIGS. 9A and 9B illustrate output characteristics of the temperature sensor corresponding to FIGS. 8A and 8B. Similar to FIG. 8A, a digital output signal corresponding to the switches SW0 to SW6 and obtained by converting a temperature to be detected is outputted as in FIG. 9A. That is, the digital output signal obtained by AD-converting the temperature at the temperature change rate (inclination) corresponding to the voltages of the switches SW0 to SW6 is outputted.

Similar to FIG. 8B, when the resistor RL is increased, an inclination of output characteristics indicating a relationship between the temperature and the output changes as in FIG. 9B. By decreasing a voltage difference between the neighboring switches SW, the inclination of output characteristics becomes steep and the temperature change rate becomes low. Further, when the value of the resistor RL is decreased, and when the voltage difference between the neighboring switches SW increases, the inclination of output characteristics becomes moderate and the temperature change rate becomes high.

In addition, the resistance value of the resistor RL is variable. However, the resistor RH may be the variable resistor, and the second adjustment non-volatile memory 122 may also adjust the resistance value of the resistor RH. By adjusting the resistance value of the resistor RH, it is possible to rise or lower the voltages of the switches SW0 to SW6, so that it is possible to adjust the temperature change rate according to the same principle as that of adjustment of the resistor RL. When, for example, the value of the resistor RH is increased, the voltage of each of the switches SW0 to SW6 lowers, the voltage difference between the neighboring switches SW becomes small, and therefore the temperature change rate becomes low. When the value of the resistor RH is decreased, the voltage of each of the switches SW0 to SW6 rises, the voltage difference between the neighboring switches SW becomes large, and therefore the temperature change rate becomes high.

When the resistor RL and the resistor RH are adjusted, the temperature change rate changes, and a detectable temperature range of the temperature sensor changes. When, for example, the resistance value of the resistor RL (low-level side resistor element) is increased, a lower limit value of the detectable temperature range of the temperature sensor rises, and, when the resistance value of the resistor RH (high-level side resistor element) is increased, an upper limit value of a detectable temperature range of the temperature sensor lowers. Hence, one or both of the resistor RL and the resistor RH is preferably adjusted to use environment of an application or a temperature range to be detected.

Further, VBGR is adjusted upon shipping based on the value of the first adjustment non-volatile memory 121. By adjusting VBGR, it is possible to rise or lower the voltages of the switches SW0 to SW6, so that the first adjustment non-volatile memory 121 can also adjust the temperature change rate. When, for example, VBGR is decreased, the difference between the voltage of each of the switches SW0 to SW6, the voltages of the neighboring switches SW becomes small as VBGR lowers, and therefore the temperature change rate becomes low. When VBGR is increased, the difference between the voltage of each of the switches SW0 to SW6 and the voltages of the neighboring switches SW becomes large as VBGR rises, and therefore the temperature change rate becomes high.

As described above, in the present embodiment, adjusting a value of an adjustment non-volatile memory makes it possible to adjust the temperature change rate of the temperature sensor. By using the first adjustment non-volatile memory and the second adjustment non-volatile memory in particular, it is possible to freely change the temperature change rate.

Due to manufacturing variations of devices such as bipolar transistors and MOSFETs, the temperature sensor has a different temperature change rate per manufactured chip. Hence, by using a first adjustment non-volatile memory region, a variation of this temperature change rate is adjusted. In this case, the value of the second adjustment non-volatile memory of each chip is set to the same value.

Subsequently, by adjusting the value of the second adjustment non-volatile memory by taking into account a value in a data sheet or the like, the user can realize the temperature change rate suitable to various applications. According to this method, the user can make adjustment without taking into account a variation of the temperature sensor and, consequently, easily control the temperature sensor. Making it easy to control the temperature sensor contributes to simplification of a circuit and improvement of performance of an application.

That is, by making correction suitable to various applications by using the temperature change rate, it is possible to improve performance of a target application. An optimal temperature change rate demanded by an application usually differs per application, so that, by making it possible to freely change the temperature change rate of the temperature sensor mounted on a microcomputer which needs to support various uses, it is possible to provide a great effect.

Further, a non-volatile memory such as a flash memory is normally mounted on a microcomputer, and, consequently, can easily control the temperature sensor. It is possible to freely and easily change the temperature change rate by using the normally mounted non-volatile memory and the temperature sensor.

Second Embodiment

The second embodiment will be described below with reference to the drawings. In the first embodiment, a second adjustment non-volatile memory changes a temperature change rate by adjusting a resistor RL in an ADC unit 112. In the present embodiment, a temperature change rate is changed by adjusting Vptat.

Figure 10:
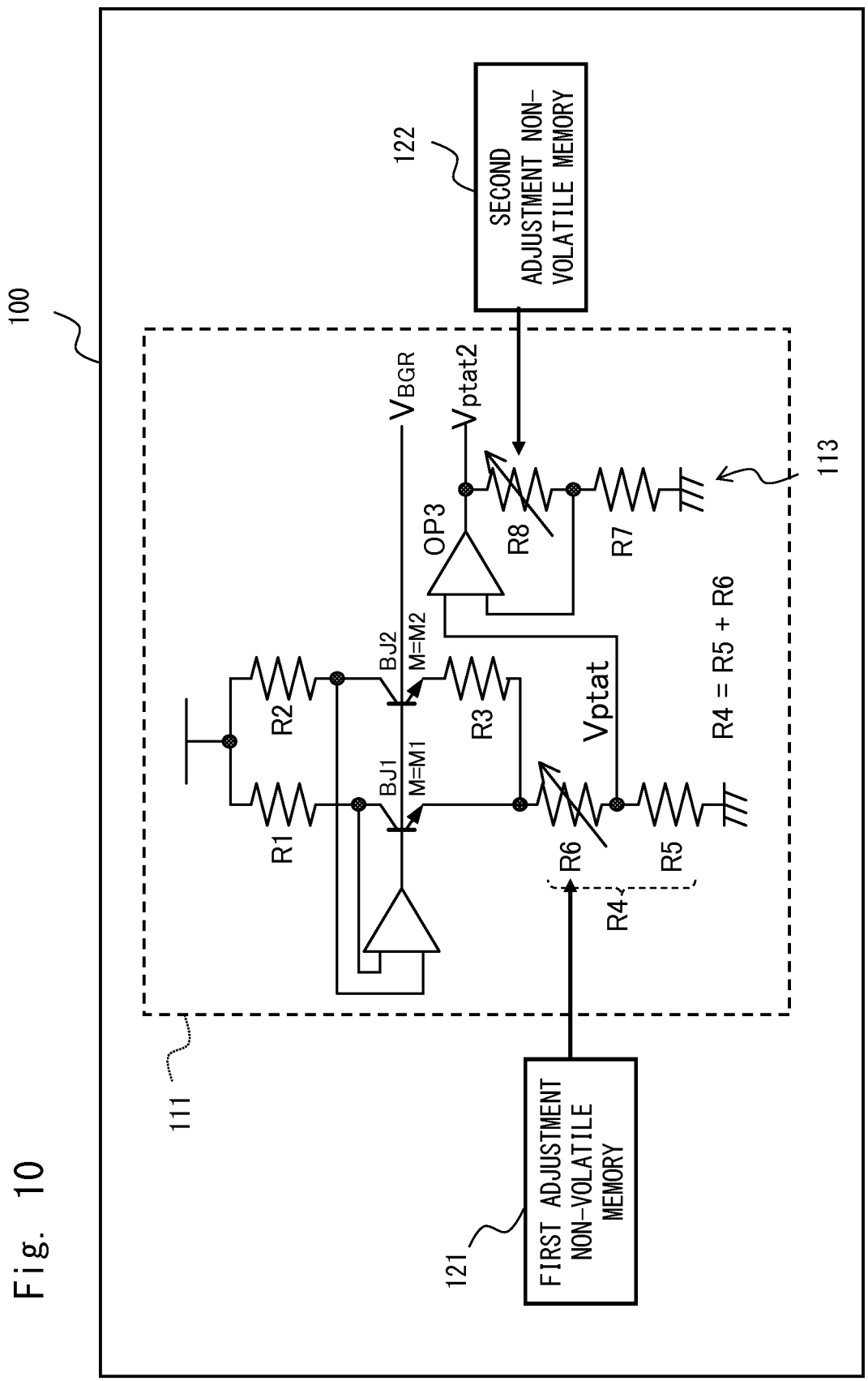
FIG. 10 is a circuit diagram illustrating a configuration example of a temperature sensing unit according to a second embodiment.

FIG. 10 illustrates a specific example of a circuit configuration of a temperature sensing unit 111 according to the present embodiment. The temperatureسsensing unit 111 in FIG. 10 includes a configuration of the temperature sensing unit 111 in FIG. 4 according to the first embodiment, and further includes an operational amplifier OP3 and resistors R7 and R8. One input terminal of the operational amplifier OP3 is connected to a node between a resistor R5 and a resistor R6 to receive an input of Vptat, the resistors R8 and R7 are connected in series between an output terminal and a group potential, and the other input terminal is connected to a node between the resistor R8 and the resistor R7.

The voltage of the output terminal of the operational amplifier OP3 is outputted as Vptat2. Vptat2 is inputted to a comparator CMP of the ADC unit 112. That is, in the present embodiment, the comparator CMP receives an input of Vref and Vptat2, and compares these two voltages.

Figure 11:
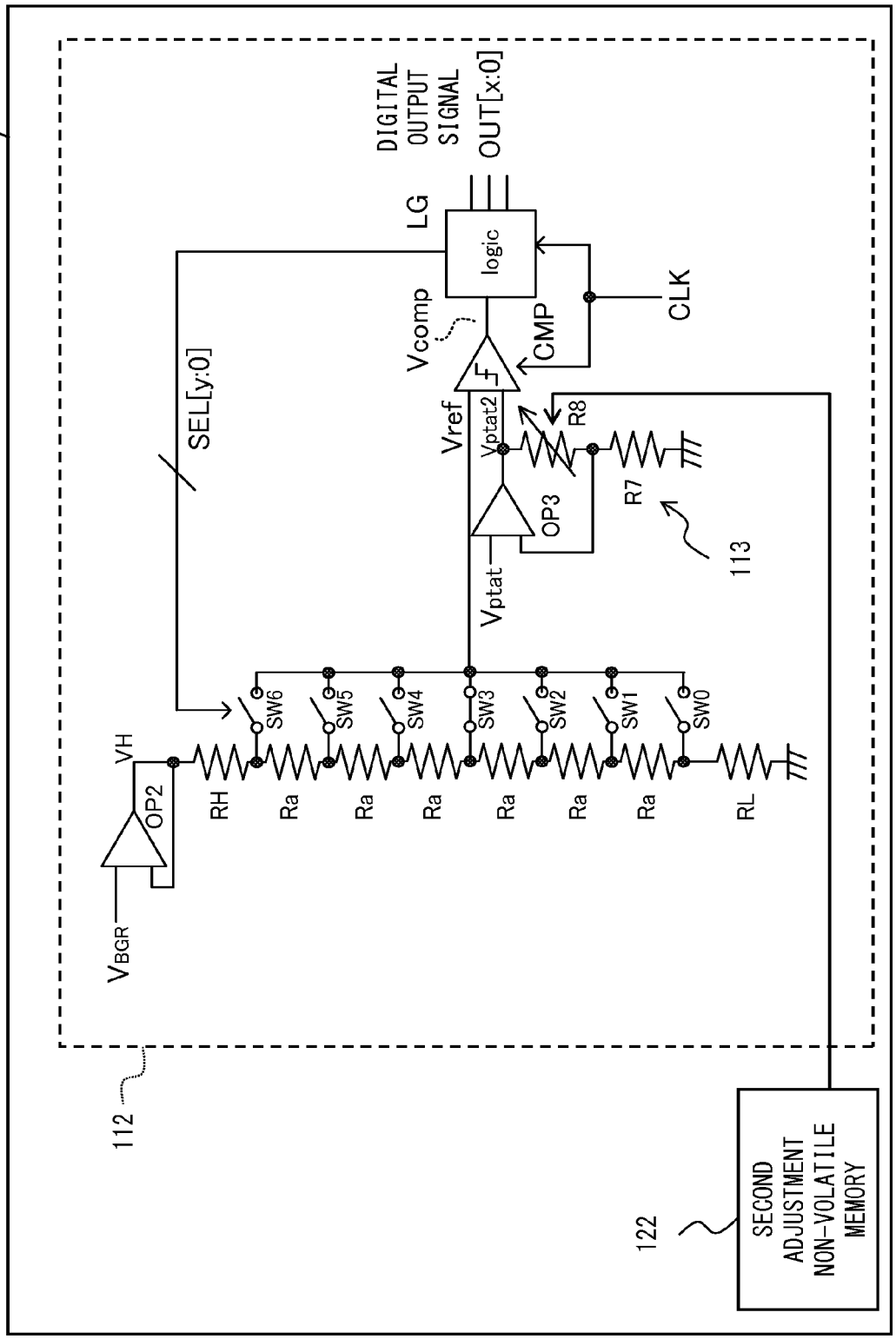
FIG. 11 is a circuit diagram illustrating a configuration example of an ADC unit according to the second embodiment.

The operational amplifier OP3 and the resistors R7 and R8 compose a Vptat adjusting unit (temperature dependence signal adjusting unit) 113 which adjusts Vptat, and the Vptat adjusting unit 113 may be arranged outside the temperature sensing unit 111 such as between the temperature sensing unit 111 and the ADC unit 112 or may be provided to the ADC unit 112 as illustrated in FIG. 11.

The Vptat adjusting unit 113 is a step-down circuit (or a step-up circuit) which steps down an input voltage, and converts the voltage of Vptat into Vptat2 expressed in following equation (5).

$$Vptat2 = \frac{R7 + R8}{R7} Vptat = 2 \frac{R5 \times (R7 + R8)}{R3 \times R7} \frac{kT}{q} \ln(n) \quad \text{equation (5)}$$

Figure 12A:
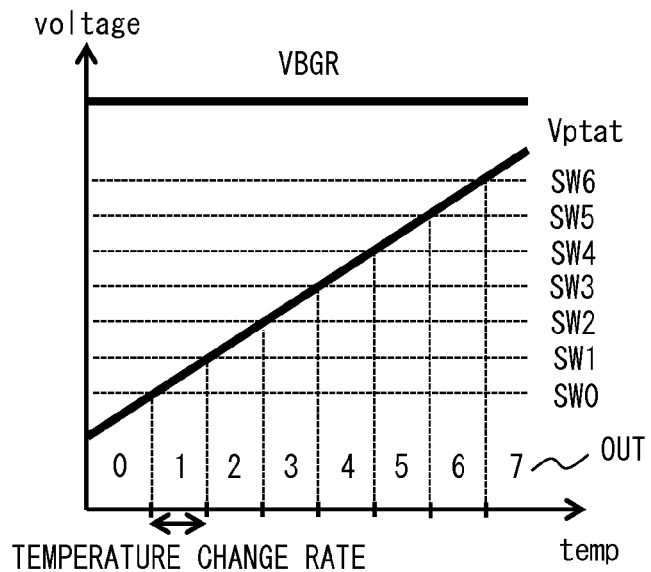
FIG. 12A is a graph for explaining a method of adjusting a semiconductor device according to the second embodiment.

In the present embodiment, it is possible to adjust Vptat2 by changing a resistance value of the resistor R8 to a variable resistance, and change a temperature change rate by adjusting Vptat2. FIG. 12A illustrates a change in a voltage with respect to a temperature when Vptat2=Vptat is true. In this case, in view of a relationship between the voltage of Vptat and voltages of switches SW0 to SW6, the temperature change rate is the same as that in the first embodiment.

Figure 12B:
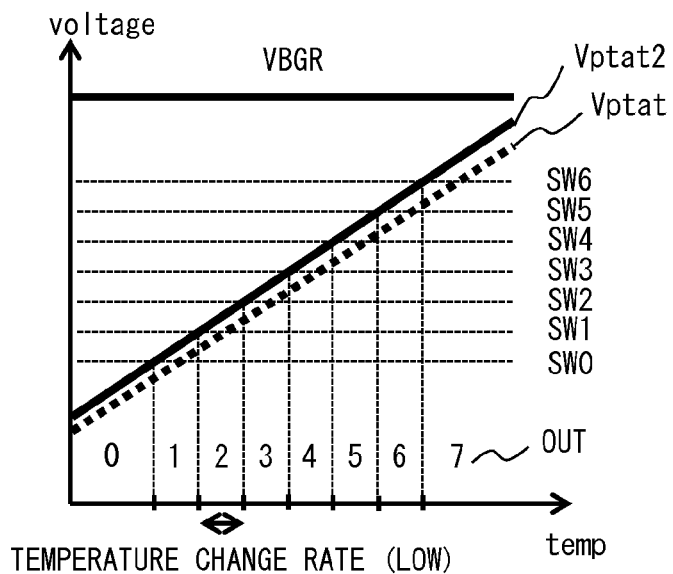
FIG. 12B is a graph for explaining the method of adjusting the semiconductor device according to the second embodiment.

FIG. 12B illustrates an example where Vptat2 is increased compared to that in FIG. 12A, i.e., Vptat2=αVptat (α>1) is true. When the Vptat adjusting unit 113 increases Vptat, the inclination of the voltage with respect to the temperature becomes steep as illustrated in FIG. 12B. Then, the temperature with respect to the voltages of the switches SW0 to SW6 lowers, a temperature range of 1 bit corresponding to the voltages of neighboring switches SW narrows, and therefore the temperature change rate becomes low. Further, when Vptat is decreased, the inclination of the voltage with respect to the temperature becomes moderate, the temperatures corresponding to the voltages of the switches SW0 to SW6 rise, the temperature range of 1 bit corresponding to the voltages of the neighboring switches SW becomes wide, and therefore the temperature change rate becomes high.

As described above, even when Vptat is adjusted according to a value of the second adjustment non-volatile memory, it is possible to freely and easily change the temperature change rate of a temperature sensor similar to the first embodiment.

Third Embodiment

The third embodiment will be described below with reference to the drawings below. In the present embodiment, another configuration example of a temperature sensing unit 111 in the first and second embodiments will be described. The temperature sensing unit 111 is not limited to a Brocaw circuit, and may be another bandgap reference circuit as long as the temperature sensing unit 111 can generate VBGR and Vptat.

Figure 13:
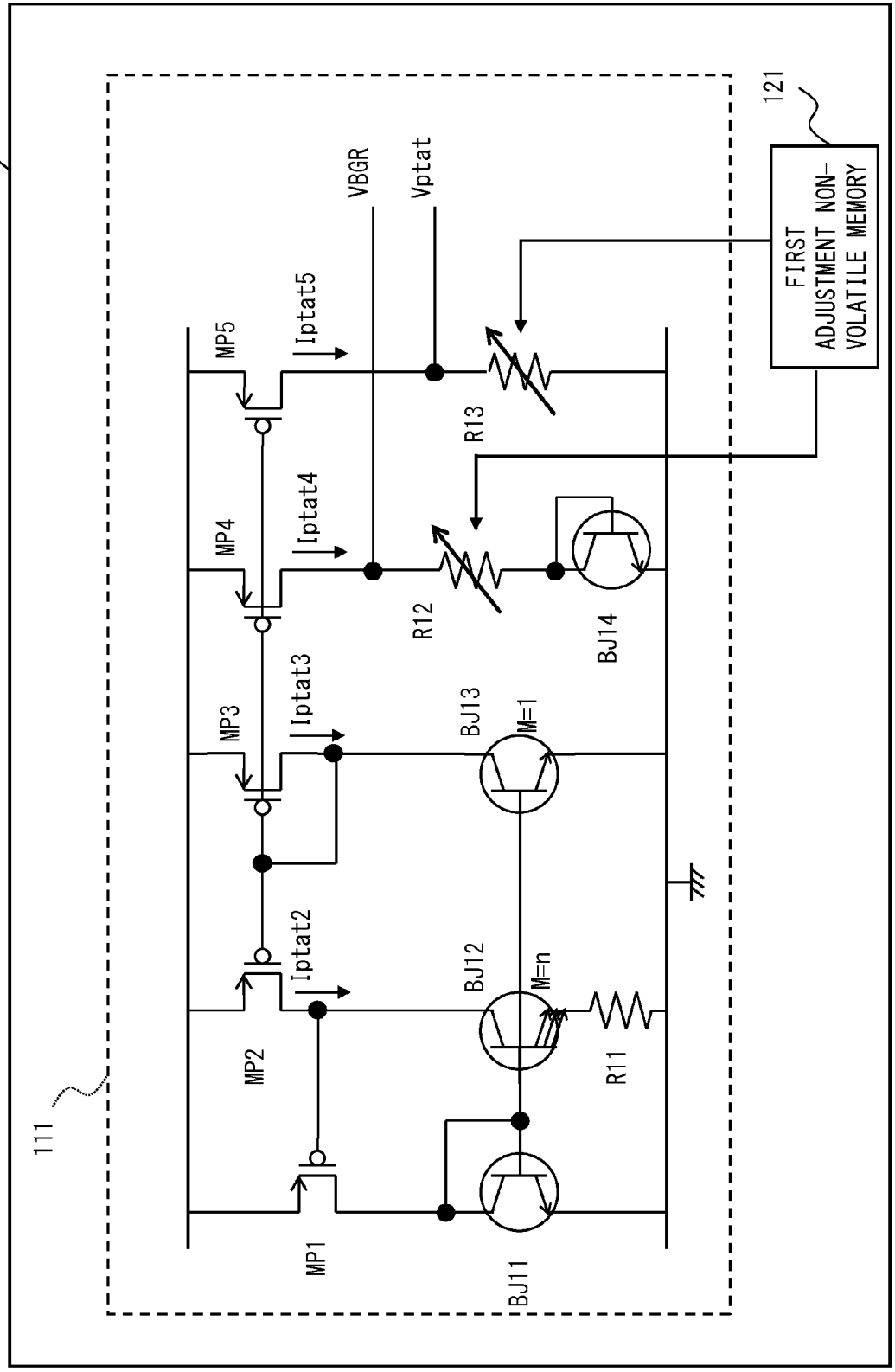
FIG. 13 is a circuit diagram illustrating a configuration example of a temperature sensing unit according to a third embodiment.

FIG. 13 illustrates another example of a circuit configuration of the temperature sensing unit 111 according to the present embodiment. As illustrated in FIG. 13, the temperature sensing unit 111 includes PMOS transistors MP1 to MP5, bipolar transistors BJ11 to BJ14 and resistors R11 to R13. The bipolar transistors BJ11 to BJ11 are, for example, NPN bipolar transistors. The PMOS transistor MP1 and the bipolar transistor BJ11 are connected in series, the PMOS transistor MP2, the bipolar transistor BJ12 and the resistor R11 are connected in series, the PMOS transistor MP3 and the bipolar transistor BJ13 are connected in series, the PMOS transistor MP4, the resistor R12 and the bipolar transistor BJ14 are connected in series, and the PMOS transistor MP5 and the resistor R13 are connected in series. These serial circuits are connected in parallel between a power supply potential and a ground potential.

The bipolar transistors BJ11 to BJ13 are provided by way of current-mirror connection. Bases of the bipolar transistors BJ11 to BJ13 and a collector of the bipolar transistor BJ11 are commonly connected. A base of the bipolar transistor BJ14 is connected to the collector.

A gate of the PMOS transistor MP1 is connected to a drain of the PMOS transistor MP2. The PMOS transistor MP2 to MP5 are provided byway of current-mirror connection. Gates of the PMOS transistors MP2 to MP5 and a drain of the PMOS transistor MP3 are commonly connected. A voltage of a node between a drain of the PMOS transistor MP4 (first transistor) and the resistor R12 (first resistor element) is outputted as VBGR. A voltage of anode between a drain of the PMOS transistor MP5 (second transistor) and the resistor R13 (second resistor element) is outputted as Vptat.

In this regard, currents Iptat (Iptat2 to Iptat5) flowing in the PMOS transistors MP2 to MP5, and Vptat are expressed as in $$Iptat = \frac{1}{R11}\frac{kT}{q}\ln(n) \qquad \text{equation (6)}$$

$$Vptat = \frac{R13}{R11}\frac{kT}{q}\ln(n) \qquad \text{equation (7)}$$

following equations (6) and (7).

Vbe is the same as that in equation (3), and therefore VBGR is expressed as in following equation (8) in view of equation (3) and equation (7).

$$\begin{aligned}VBGR &= Vbe + Vptat \qquad \text{equation (8)}\\ &= \frac{Eg}{q} - \frac{kT}{q}\ln\left(\frac{A}{Ic}\right) + \frac{R12}{R11}\frac{kT}{q}\ln(n)\\ &= \frac{Eg}{q} + \frac{kT}{q}\left(\frac{R12}{R11}\ln(n) - \ln\left(\frac{A}{Ic}\right)\right)\end{aligned}$$

In view of equation (6), Iptat is proportional to an absolute temperature T, and, similarly, in view of equation (7), Vptat is also proportional to the absolute temperature T. The configuration in FIG. 13 can generate the fixed voltage VBGR with respect to the temperature and Vptat having the inclination with respect to the temperature in view of equations (7) and (8).

The ideally same currents Iptat (=Iptat2=Iptat3=Iptat4=Iptat5) flow in the four PMOS transistors MP2 to MP5 yet do not become equal due to VDS dependency or mismatch of the PMOS transistors. Hence, variations of voltage values of VBGR and Vptat caused at random per sample are changed based on resistance values of R12 and R13. That is, by changing the resistance values of the resistors R12 and R13 according to a value (error correction data) of a code stored in the first adjustment non-volatile memory 121, it is possible to correct an error. The configurations of the variable resistors R12 and R13 may be the same as that of the resistor R6 in FIG. 5.

As described above, even when the temperature sensing unit of a temperature sensor is configured as another bandgap reference circuit, it is possible to realize the temperature sensor which can freely and easily change a temperature change rate similar to the above embodiments.

Fourth Embodiment

In the following embodiments including the present embodiment, application examples where a semiconductor device 100 according to the above embodiments is applied to various applications will be described. In addition, one of the semiconductor devices 100 according to the first to third embodiments may be used in the following embodiments.

Figure 14:
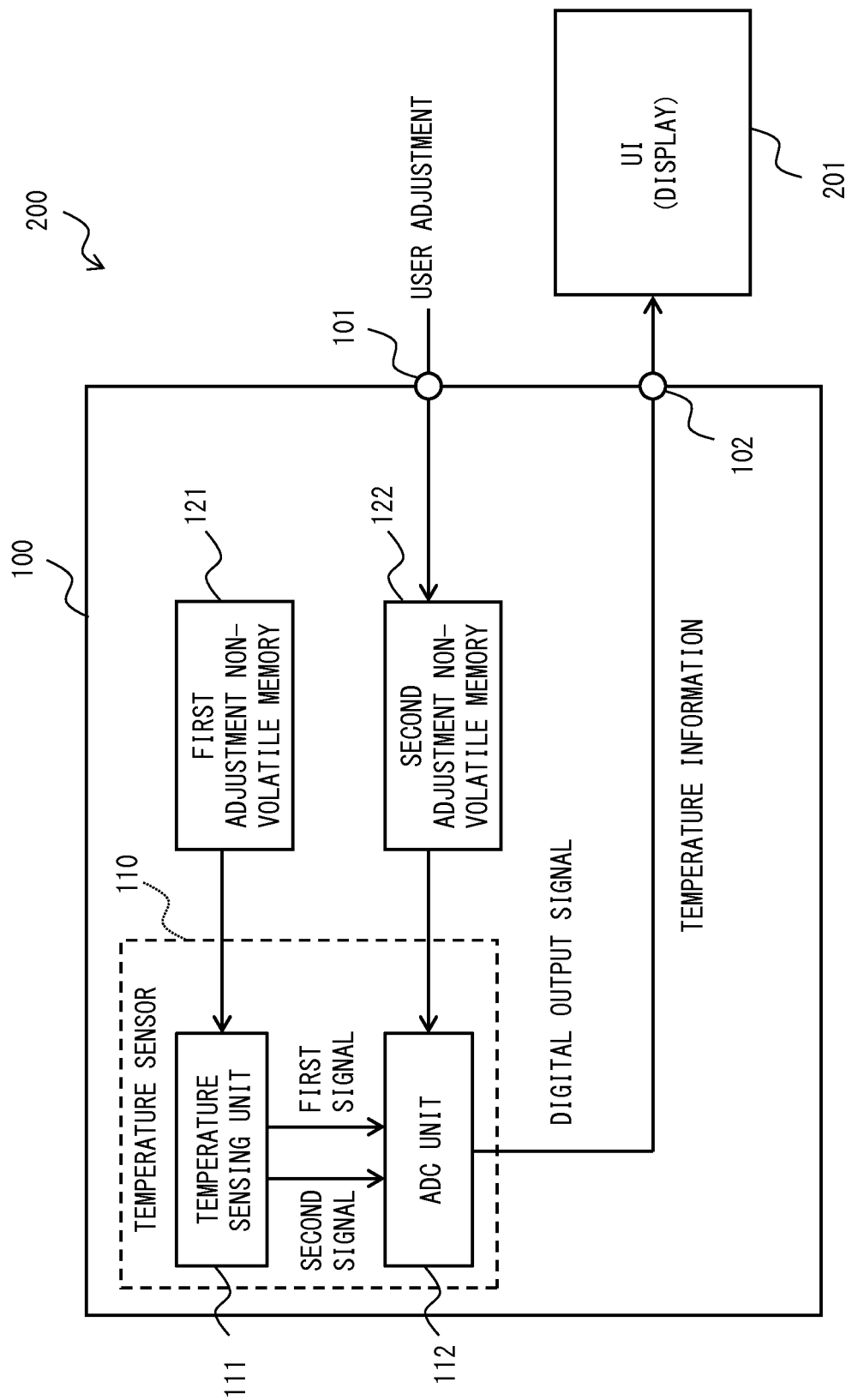
FIG. 14 is a configuration diagram illustrating a configuration of an application example of a thermometer according to a fourth embodiment.

FIG. 14 illustrates an example where the semiconductor device 100 according to the above embodiments is applied to a thermometer (temperature display system). For example, a thermometer 200 includes the semiconductor device 100 and a UI (user interface) circuit 201. In this example, the semiconductor device 100 includes a temperature sensor 110, a first adjustment non-volatile memory 121, and a second adjustment non-volatile memory 122 similar to the first embodiment, and, in addition, a user adjustment terminal 101 and a temperature information output terminal 102.

Adjustment data for shipping is stored in the first adjustment non-volatile memory 121, and an error due to manufacturing variations is corrected. Further, a user arbitrarily adjusts a temperature change rate by inputting adjustment data to the second adjustment non-volatile memory 122 through the user adjustment terminal 101. The temperature information output terminal 102 is connected with the UI circuit 201 such as a display which displays temperature information of a digital value outputted from the temperature sensor 110. The UI circuit 201 only needs to be a device which can transmit temperature information to the user by an arbitrary method.

Figure 15A:
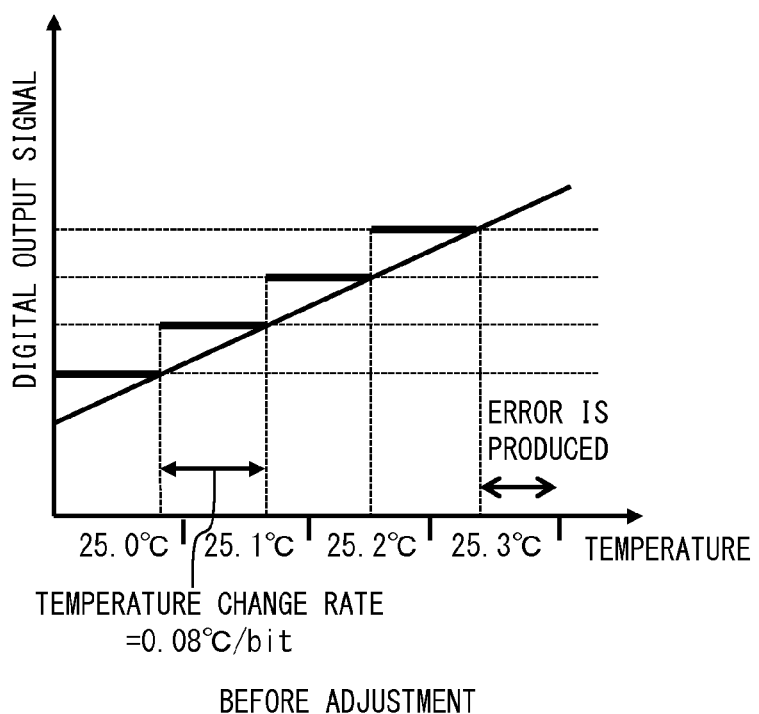
FIG. 15A is a graph for explaining a method of adjusting the application example of the thermometer according to the fourth embodiment.
Figure 15B:
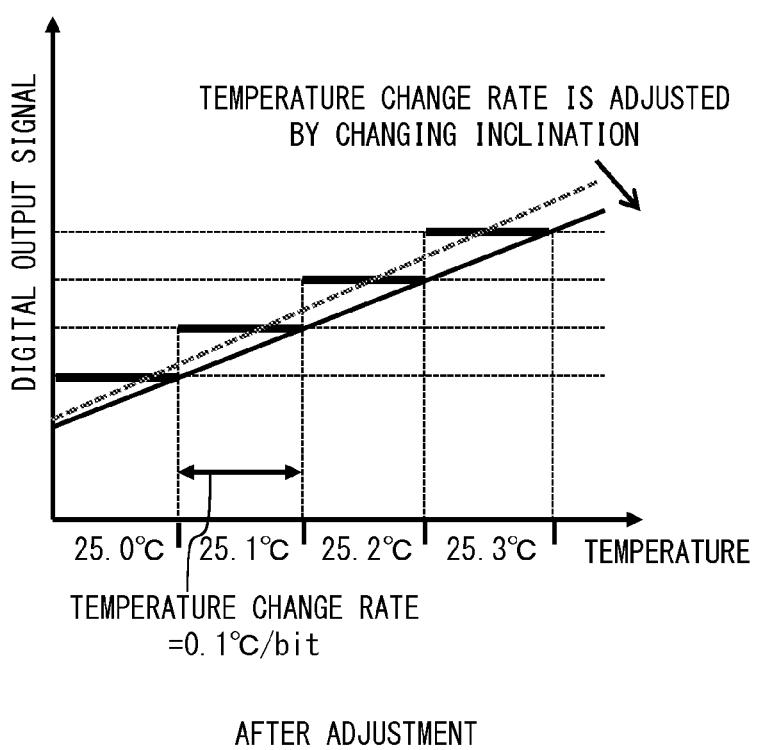
FIG. 15B is a graph for explaining the method of adjusting the application example of the thermometer according to the fourth embodiment.

FIGS. 15A and 15B illustrate examples where the semiconductor device 100 of the thermometer 200 adjusts a temperature change rate. For example, a case where a thermometer which changes an indication per 0.1° C. is designed will be described.

As illustrated in FIG. 15A, a code outputted from the temperature sensor 110 changes per 0.08° C. before adjustment. In this case, a gap is produced in a relationship between a digital output and a temperature, and an error is produced. A precise ADC unit 112 needs to be provided as a countermeasure of increasing bits of an ADC unit 112 and changing 0.08° C. by one code per 0.04° C., and is designed as a custom product.

However, since the user can freely adjust a temperature change rate by using the second adjustment non-volatile memory as described in the above embodiments, the temperature change rate can be adjusted to change a code outputted from the temperature sensor 110 per 0.1° C. as illustrated in FIG. 15B, so that it is possible to design a thermometer which displays a temperature directly corresponding to a digital code without an error.

Fifth Embodiment

Figure 16:
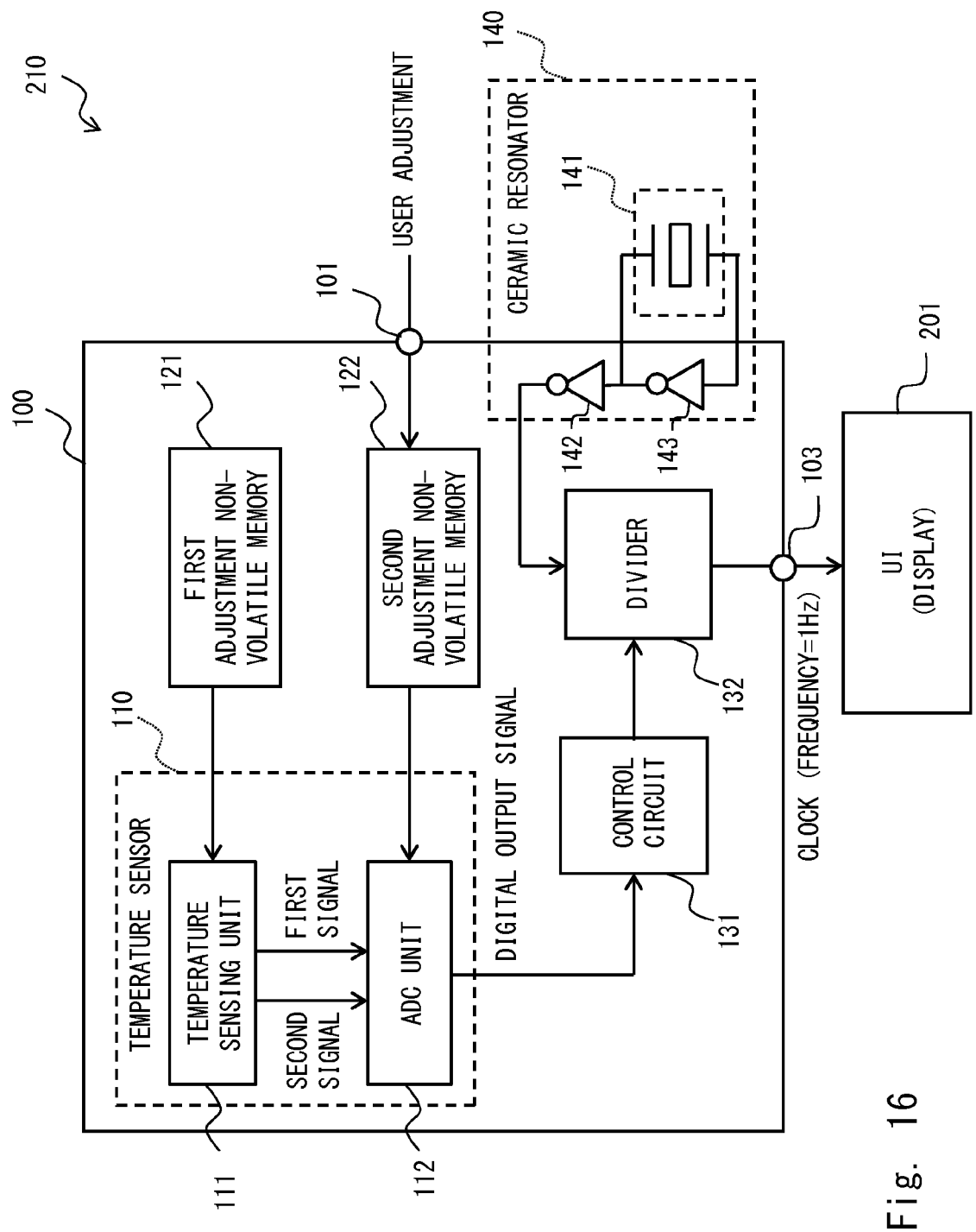
FIG. 16 is a configuration diagram illustrating a configuration of an application example of a clock according to a fifth embodiment.

FIG. 16 illustrates an example where a semiconductor device 100 according to the above embodiments is applied to a clock (time display system) based on a ceramic resonator. For example, a clock 210 includes the semiconductor device 100 and a UI circuit 201.

In this example, the semiconductor device 100 includes a temperature sensor 110, a first adjustment non-volatile memory 121, and a second adjustment non-volatile memory 122 similar to the first embodiment, and, in addition, a user adjustment terminal 101, a clock output terminal 103, a control circuit 131, a divider 132 and a ceramic oscillator 140. Adjustment data for shipping is stored in the first adjustment non-volatile memory 121, and, further, a user arbitrarily adjusts a temperature change rate by inputting adjustment data to the second adjustment non-volatile memory 122 through the user adjustment terminal 101.

The ceramic oscillator 140 is a circuit which generates a clock of a predetermined frequency by using a ceramic resonator, and includes a ceramic resonator 141 and inverters 142 and 143. For example, the ceramic resonator 141 is provided outside the semiconductor device 100. The ceramic resonator 141 and the inverter 143 are connected in parallel, the inverter 142 and the inverter 143 are connected in series and the inverter 142 outputs a clock.

The divider 132 divides a clock generated by the ceramic oscillator 140, and outputs the divided clocks to the UI circuit 201 through the clock output terminal 103. The control circuit 131 switches a division ratio of a clock of the divider 132 based on a digital value outputted from the temperature sensor 110.

Figure 17:
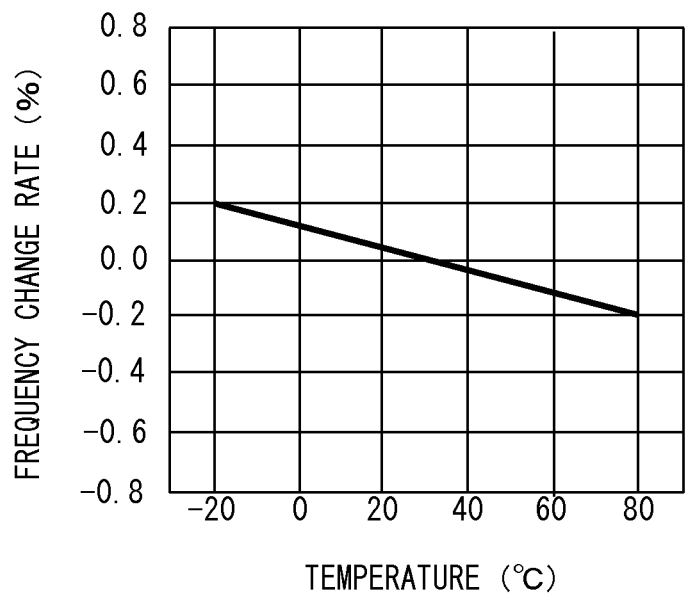
FIG. 17 is a graph illustrating characteristics of a resonator used in the application example of the clock according to the fifth embodiment.

In the clock 210, the UI circuit 201 changes an indication of a time based on a clock of frequency=1 Hz outputted from the divider 132. In this case, very precise frequency accuracy of ±50 ppm (±0.005%) is demanded. However, the ceramic resonator is low-cost and, on the contrary, as a characteristics example of the ceramic resonator illustrated in FIG. 17 shows, a frequency fluctuation corresponding to a temperature is ±2000 ppm and is high and therefore the ceramic resonator cannot be used as is. Hence, frequency accuracy needs to be improved by the following method. A case where a ceramic resonator having the characteristics in FIG. 17 is used will be described as an example.

Figure 18:
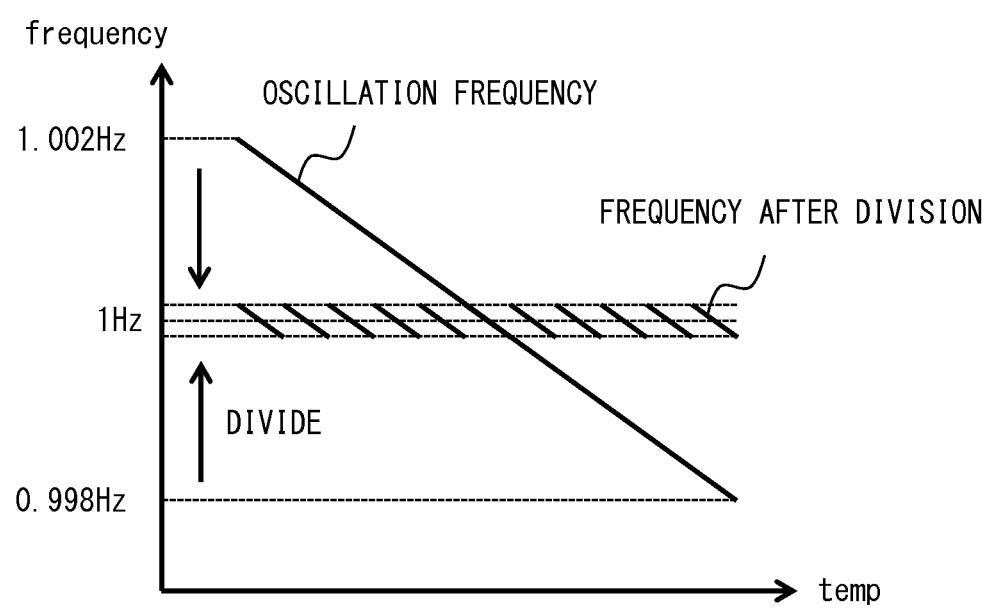
FIG. 18 is a graph for explaining a method of adjusting the application example of the clock according to the fifth embodiment.

When an output frequency of the ceramic oscillator is 1 MHz, the output frequency becomes 1 HZ by being divided by 1,000,000. However, the frequency changes by 0.2% at a low temperature, and therefore 1.002 MHz is outputted. When the division ratio is 1,002,000 in this case, it is possible to obtain 1 Hz. That is, as illustrated in FIG. 18, by switching the division ratio per temperature to suit to characteristics of the ceramic resonator, it is possible to improve frequency accuracy.

What is important in this case is a temperature change rate. When the division ratio is switched between 998,000 and 1,002,000 during −20° C. to 80° C., 100/4000=0.025° C./step is simply an optimal value. If an inclination of a change in an oscillation frequency caused by the temperature of the ceramic resonator is fixed and the temperature change rate can be set to 0.025° C./step, the frequency accuracy is ±0.5 ppm and, when the temperature change rate is 0.1° C./step, the frequency accuracy is ±2 ppm.

In this regard, characteristics of all ceramic oscillator are not actually the same, and vary per ceramic oscillator. By adjusting this variation per ceramic oscillator by using the second adjustment non-volatile memory as in the above embodiments, it is possible to easily obtain the ideal frequency accuracy.

In addition, the same method enables application to a USB (Universal Serial Bus) which demands frequency accuracy of ±500 ppm.

Sixth Embodiment

Figure 19:
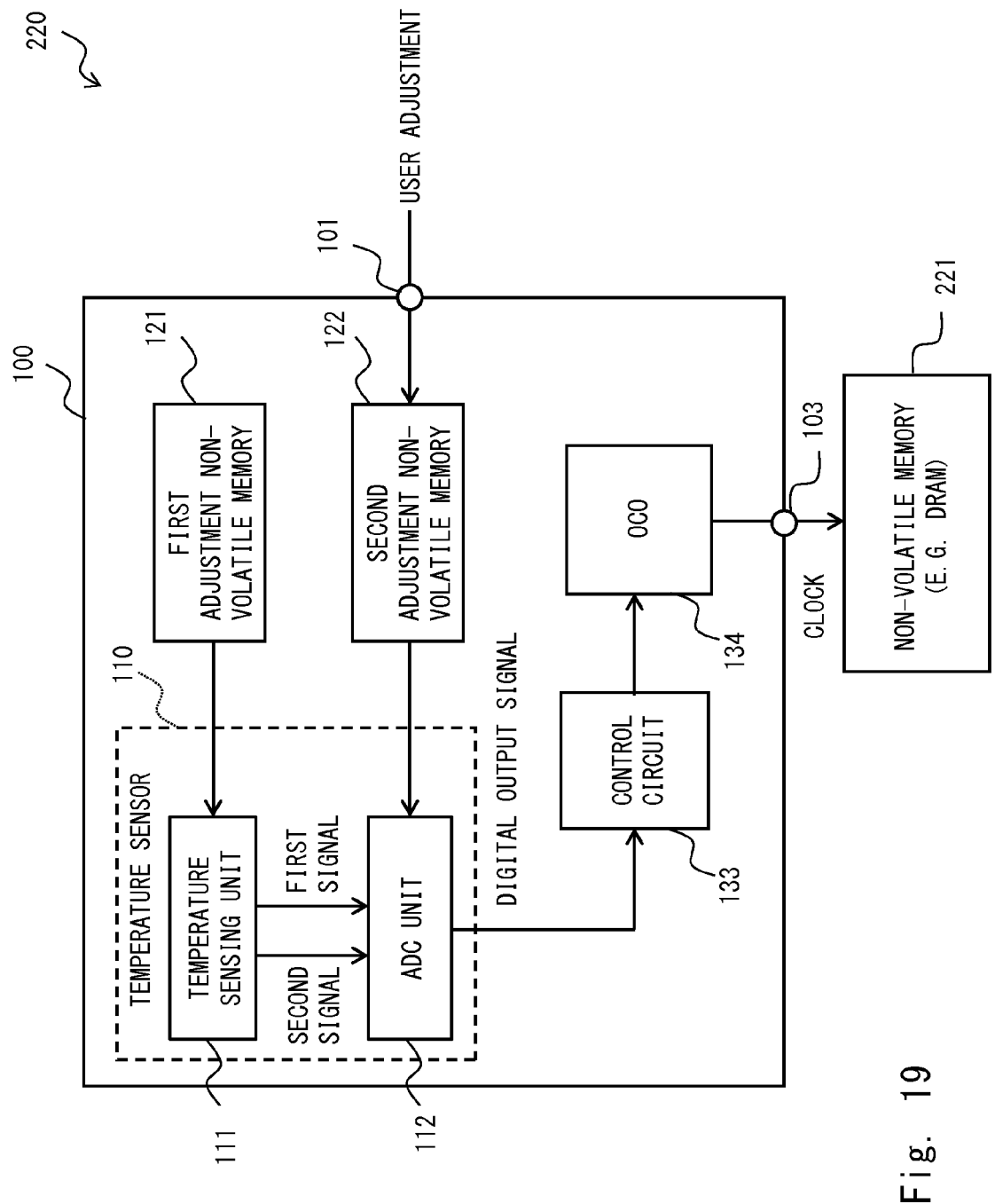
FIG. 19 is a configuration example illustrating a configuration of an application example of a non-volatile memory control device according to a sixth embodiment.

FIG. 19 illustrates an example where a semiconductor device 100 according to the above embodiments is applied to a non-volatile memory control device (non-volatile memory control system) which needs to be subjected to a refresh operation on a regular basis. For example, a non-volatile memory control device 220 includes a semiconductor device 100 and a non-volatile memory 221.

In this example, the semiconductor device 100 includes a temperature sensor 110, a first adjustment non-volatile memory 121, and a second adjustment non-volatile memory 122 similar to the first embodiment, and, in addition, a user adjustment terminal 101, a clock output terminal 103, a control circuit 133 and an OCO (On-Chip-oscillator) 134. Adjustment data for shipping is stored in the first adjustment non-volatile memory 121, and a user arbitrarily adjusts a temperature change rate by inputting adjustment data to the second adjustment non-volatile memory 122 through the user adjustment terminal 101.

The OCO 134 is an oscillator mounted on the semiconductor device, generates a clock of a predetermined frequency and outputs the generated clock to the non-volatile memory 221 through the clock output terminal 103. The control circuit 133 switches the frequency of the clock generated by the OCO 134 based on a digital value outputted from the temperature sensor 110.

Normally, as described in the fourth embodiment, the clock is preferably fixed irrespectively of the temperature. Hence, upon shipping of a semiconductor device, the clock of the OCO is adjusted to be fixed. However, this is not a case when the semiconductor device is applied to a non-volatile memory such as a DRAM which needs to be subjected to a refresh operation on a regular basis by using a clock.

Figure 20A:
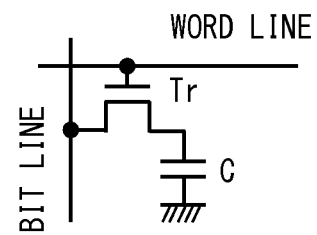
FIG. 20A illustrates a memory cell of a DRAM of a 1Tr-1Cap type.

This refresh operation will be described. FIG. 20A illustrates a memory cell of a DRAM of a 1Tr-1Cap type (1 transistor-1 capacitor). In the DRAM, a plurality of word lines and a plurality of bit lines are orthogonal in a grid pattern and extend, and memory cells are formed at positions at which the word lines and the bit lines intersect. As illustrated in FIG. 20A, the memory cell includes a transistor Tr and a capacitor C. The transistor Tr has a gate connected to the word line and a drain (or a source) connected to the bit line, and the capacitor C is connected between the source (or the drain) and a ground potential.

Figure 20B:
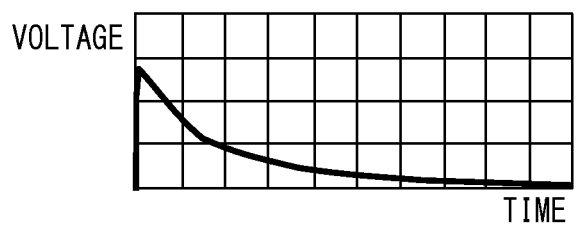
FIG. 20B illustrates information accumulated in the capacitor C and lost as time passes due to a leakage current of the transistor Tr.
Figure 20C:
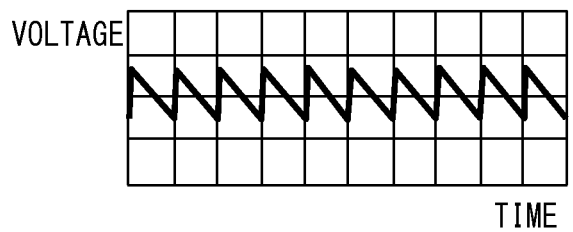
FIG. 20C illustrates the rewriting a value in a memory cell on a regular basis in a refresh operation.

In this case, information (0 or 1) accumulated in the capacitor C is lost as time passes due to a leakage current of the transistor Tr as illustrated in FIG. 20B. Hence, as illustrated in FIG. 20C, rewriting a value in a memory cell on a regular basis is required and is referred to as a refresh operation.

The longer an interval of this refresh operation is, the better from a point of view of a low consumption current (i.e., the frequency is low). Further, the information accumulated in the capacitor is lost due to a leakage current of the transistor. Characteristics of this leakage current are that the leakage current increases as the temperature becomes high. That is, the interval of the refresh operation needs to be shortened as the temperature becomes high, and, when the clock frequency is fixed, even though the temperature is low and the refresh operation does not need to be performed, the refresh operation is performed and a consumption current is unnecessarily increased.

Hence, as in the above embodiments, when a user changes a temperature change rate to increase the clock frequency by using the second adjustment non-volatile memory to suit to characteristics of a non-volatile memory to use as the temperature becomes high, it is possible to eliminate this waste. For example, the user may change the temperature change rate according to the temperature or the control circuit 133 or a CPU may automatically change a value of the second adjustment non-volatile memory according to the temperature.

Seventh Embodiment

Figure 21:
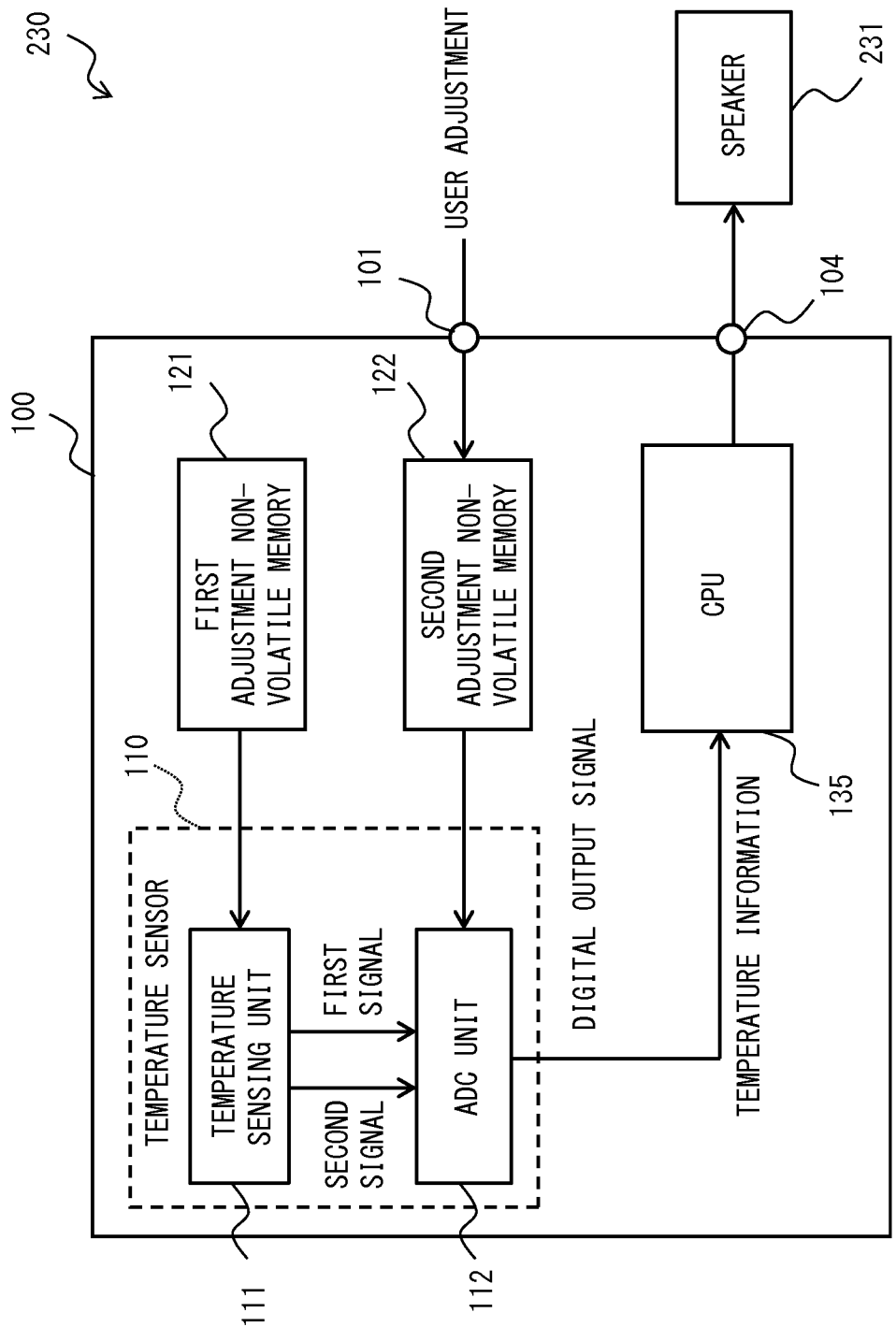
FIG. 21 is a configuration diagram illustrating a configuration of an application example of a microcomputer system according to a seventh embodiment.

FIG. 21 illustrates an example where a semiconductor device 100 according to the above embodiments is applied to a microcomputer system. For example, a microcomputer system 230 includes the semiconductor device 100 and a speaker 231.

The semiconductor device 100 is an example of a microcomputer, and includes a temperature sensor 110, a first adjustment non-volatile memory 121, and a second adjustment non-volatile memory 122 similar to the first embodiment, and, in addition, a user adjustment terminal 101, a speaker output terminal 104 and a CPU 135. Adjustment data for shipping is stored in the first adjustment non-volatile memory 121, and, further, a user arbitrarily adjusts a temperature change rate by inputting adjustment data to the second adjustment non-volatile memory 122 through the user adjustment terminal 101.

The CPU 135 obtains digital temperature information outputted from the temperature sensor 110, and performs processing based on temperature information. When, for example, the temperature information exceeds a predetermined reference, the CPU 135 outputs an alarm signal to a speaker 231 through the speaker output terminal 104 and sets out an alarm from the speaker 231. As described in the embodiments, when the user adjusts the temperature change rate by using the second adjustment non-volatile memory, it is possible to cause a speaker set out an alarm at desired accuracy.

The invention invented by the inventors has been specifically described above based on the embodiments. The present invention is not limited to the above-described embodiments and can be variously changed without departing from the spirit of the present invention.

The first to seven embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
   a temperature change rate adjustment data storage unit that stores temperature change rate adjustment data;
   a temperature sensing unit that generates an analog sensing signal corresponding to a temperature; and
   an AD converter unit that converts the sensing signal into a digital output signal corresponding to an adjusted temperature change rate based on a temperature change rate adjustment signal for adjusting the temperature change rate,
   wherein the AD converter unit adjusts the temperature change rate based on the temperature change rate adjustment data obtained from the temperature change rate adjustment data storage unit.

2. The semiconductor device according to claim 1, wherein the temperature sensing unit corrects an error of the generated sensing signal based on an error correction signal for correcting the error.

3. The semiconductor device according to claim 1, wherein the temperature sensing unit corrects an error of the generated sensing signal based on an error correction signal for correcting an error.

4. The semiconductor device according to claim 3, further comprising an error correction data storage unit that stores error correction data,
   wherein the temperature sensing unit corrects the error of the sensing signal based on the error correction data obtained from the error correction data storage unit.

5. A semiconductor device comprising:
   a temperature sensing unit that generates an analog sensing signal corresponding to a temperature; and
   an AD converter unit that converts the sensing signal into a digital output signal corresponding to an adjusted temperature change rate based on a temperature change rate adjustment signal for adjusting the temperature change rate, wherein the temperature sensing unit generates, as the sensing signal, a temperature dependence signal that depends on a temperature and a non-temperature dependence signal of a fixed level that does not depend on the temperature, and wherein the AD converter unit compares a level of a target signal based on the temperature dependence signal and a level of a reference signal based on the non-temperature dependence signal, and generates the output signal.

6. The semiconductor device according to claim 5, wherein the temperature sensing unit corrects a level of the non-temperature dependence signal based on an error correction signal for correcting an error.

7. The semiconductor device according to claim 6, wherein the temperature sensing unit includes:
first and second transistors that are connected in parallel between a first potential and a second potential, and output the non-temperature dependence signal from control terminals of the first and second transistors, and
first and second resistor elements that are connected in series between the first and second transistors and the second potential, and output the temperature dependence signal from an intermediate node of the serial connection, and
wherein the first resistor element changes a resistance value based on the error correction signal.

8. The semiconductor device according to claim 5, wherein the temperature sensing unit corrects levels of the non-temperature dependence signal and the temperature dependence signal based on an error correction signal for correcting an error.

9. The semiconductor device according to claim 8, wherein the temperature sensing unit includes:
first and second transistors that are provided by way of current-mirror connection,
a first resistor element that is connected with the first transistor in series and outputs the non-temperature dependence signal from an intermediate node between the first resistor element and the first transistor, and
a second resistor element that is connected with the second transistor in series and outputs the temperature dependence signal from an intermediate node between the second resistor element and the second transistor, and the first resistor element and the second resistor element change resistance values based on the error correction signal.

10. The semiconductor device according to claim 5, wherein the AD converter unit adjusts the level of the reference signal based on the temperature change rate adjustment signal.

11. The semiconductor device according to claim 10, wherein the AD converter unit includes a voltage dividing unit that divides the non-temperature dependence signal into a plurality of divided voltages and generates the reference signal, and
wherein the voltage dividing unit adjusts levels of the plurality of divided voltages based on the temperature change rate adjustment signal.

12. The semiconductor device according to claim 11, wherein the voltage dividing unit adjusts a potential difference between the plurality of divided voltages based on the temperature change rate adjustment signal.

13. The semiconductor device according to claim 11, wherein the voltage dividing unit includes a plurality of voltage dividing resistor elements that are connected in series, and
wherein a voltage dividing resistor element of a lowest level among the plurality of voltage dividing resistor elements changes a resistance value based on the temperature change rate adjustment signal.

14. The semiconductor device according to claim 11, wherein the voltage dividing unit includes a plurality of voltage dividing resistor elements that are connected in series, and
wherein a voltage dividing resistor element of a highest level among the plurality of voltage dividing resistor elements changes a resistance value based on the temperature change rate adjustment signal.

15. The semiconductor device according to claim 5, further comprising:
a temperature dependence signal adjusting unit that adjusts a level of the generate temperature dependence signal based on the temperature change rate adjustment signal.

16. The semiconductor device according to claim 15, wherein the temperature dependence signal adjusting unit is included in the temperature sensing unit.

17. The semiconductor device according to claim 15, wherein the temperature dependence signal adjusting unit is included in the AD converter unit.

* * * * *